United States Patent
Maathur et al.

(10) Patent No.: US 12,093,999 B2
(45) Date of Patent: Sep. 17, 2024

(54) SYSTEMS AND METHODS FOR CONVERTING CRYPTOCURRENCY

(71) Applicant: Coinbase, Inc., San Francisco, CA (US)

(72) Inventors: Jeevan Maathur, San Francisco, CA (US); Sahil Amoli, San Francisco, CA (US); Bojan Joveski, San Francisco, CA (US); John Zettler, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/350,539

(22) Filed: Jun. 17, 2021

(65) Prior Publication Data

US 2021/0398211 A1    Dec. 23, 2021

Related U.S. Application Data

(60) Provisional application No. 63/067,556, filed on Aug. 19, 2020, provisional application No. 63/040,360, filed on Jun. 17, 2020.

(51) Int. Cl.
*G06Q 40/04* (2012.01)
*G06Q 20/06* (2012.01)
*G06Q 20/38* (2012.01)
*G06Q 20/40* (2012.01)

(52) U.S. Cl.
CPC .......... *G06Q 40/04* (2013.01); *G06Q 20/065* (2013.01); *G06Q 20/389* (2013.01); *G06Q 20/401* (2013.01)

(58) Field of Classification Search
CPC .... G06Q 40/04; G06Q 20/065; G06Q 20/389; G06Q 20/401; G06Q 20/38; G06Q 20/40; G06Q 20/06
See application file for complete search history.

(56) References Cited

U.S. PATENT DOCUMENTS

| | | | |
|---|---|---|---|
| 10,269,009 B1 | 4/2019 | Winklevoss et al. | |
| 10,540,654 B1* | 1/2020 | James | G06Q 20/223 |
| 11,139,955 B1* | 10/2021 | So | G06Q 20/3674 |
| 11,310,060 B1* | 4/2022 | Poelstra | H04L 9/3066 |
| 11,334,883 B1* | 5/2022 | Auerbach | G06Q 20/223 |
| 11,501,370 B1* | 11/2022 | Paya | G06Q 20/3676 |
| 11,522,700 B1* | 12/2022 | Auerbach | G06F 16/27 |
| 2014/0007222 A1* | 1/2014 | Qureshi | H04L 67/10 726/16 |

(Continued)

FOREIGN PATENT DOCUMENTS

| | | | | | |
|---|---|---|---|---|---|
| CN | 108292401 A | * | 7/2018 | ......... | G06Q 20/0658 |
| CN | 109559227 A | * | 4/2019 | ......... | G06F 21/6227 |

(Continued)

OTHER PUBLICATIONS

"An analysis of batching in Bitcoin", Coin Metrics team, May 20, 2018, https://coinmetrics.io/batching/.

(Continued)

*Primary Examiner* — Kenneth Bartley
(74) *Attorney, Agent, or Firm* — Foley & Lardner LLP

(57) ABSTRACT

A method for cryptocurrency conversion includes: determining conversion information; sending the cryptocurrency to a (Continued)

settlement address; determining conversion orders; determining transaction completion; and executing the conversion orders.

20 Claims, 13 Drawing Sheets

(56) References Cited

U.S. PATENT DOCUMENTS

| | | | |
|---|---|---|---|
| 2015/0324789 A1 | 11/2015 | Dvorak et al. | |
| 2015/0332256 A1 | 11/2015 | Minor | |
| 2015/0332395 A1 | 11/2015 | Walker et al. | |
| 2015/0363769 A1 | 12/2015 | Ronca et al. | |
| 2017/0187535 A1 | 6/2017 | Middleton et al. | |
| 2018/0276626 A1 | 9/2018 | Laiben | |
| 2019/0156303 A1* | 5/2019 | Shtylman | G06Q 40/04 |
| 2019/0172026 A1* | 6/2019 | Vessenes | G06Q 20/3674 |
| 2019/0188711 A1* | 6/2019 | Wu | G06Q 20/3678 |
| 2019/0220859 A1 | 7/2019 | Weight et al. | |
| 2019/0251199 A1* | 8/2019 | Klianev | G06F 16/2308 |
| 2019/0287174 A1 | 9/2019 | Black et al. | |
| 2019/0306235 A1 | 10/2019 | Veale et al. | |
| 2019/0311337 A1* | 10/2019 | Madisetti | G06Q 20/3823 |
| 2019/0311357 A1* | 10/2019 | Madisetti | G06Q 20/381 |
| 2019/0318356 A1* | 10/2019 | Martin | H04L 9/0637 |
| 2019/0333051 A1 | 10/2019 | Brogger | |
| 2019/0340586 A1* | 11/2019 | Sheng | G06Q 20/367 |
| 2020/0013027 A1* | 1/2020 | Zhu | H04L 9/50 |
| 2021/0073913 A1* | 3/2021 | Ingargiola | G06Q 20/3676 |
| 2021/0398211 A1* | 12/2021 | Maathur | G06Q 20/381 |

FOREIGN PATENT DOCUMENTS

| | | | | |
|---|---|---|---|---|
| JP | 2022547130 A | * | 10/2022 | |
| KR | 20200130558 A | * | 11/2020 | |
| WO | WO-2018204822 A1 | * | 11/2018 | G06F 16/951 |
| WO | WO-2020014551 A1 | * | 1/2020 | G06F 16/9024 |
| WO | WO-2020190720 A1 | * | 9/2020 | G06Q 20/065 |
| WO | WO-2021257826 A1 | * | 12/2021 | G06Q 20/065 |

OTHER PUBLICATIONS

"BitAuth, for Decentralized Authentication", bitty, Engineering, Jul. 1, 2014, https://bitpay.com/blog/bitauth-for-decentralized-authentication/.

"BitPay Introduces Stable Coin Settlements in Gemini Dollars and Circle USD Coin", https://bitpay.com/blog/stable-coin-settlement/, Oct. 15, 2018.

"Coinbase Commerce API", https://web.archive.org/web/20180507175332/http://commerce.coinbase.com/docs/.

"ERC20 Token Payment Processing—Powered by CoinPayments", https://blog.coinpayments.net/announcements/erc20-token-payment-processing-powered-by-coinpayments, May 28, 2018.

"Integrate crypto payments into your .Net applications with AtomicPay", https://msicc.net/integrate-crypto-payments-into-your-net-applications-with-atomicpay/, Jan. 10, 2019.

"Merchant Payment Gateway", Coingate, https://developer.coingate.com.

Andrews, Jordan, "The CREATE2 OpCode and DApp Onboarding in Ethereum", https://hackernoon.com/the-create2-opcode-and-dapp-onboarding-in-ethereum-e2178e6c20cb, Jan. 12, 2019.

Faridi, Omar, "Global Cryptocurrency Payments Solution to Support 156 Crypto-to-Fiat Options", https://www.cryptoglobe.com/latest/2019/01/non-custodial-crypto-payment-solution-launched-by-atomicpay/, Jan. 13, 2019.

Gogo, Jeffrey, "Thai Startup Atomicpay Launches Non-Custodial Cryptocurrency Payments Platform", https://news.bitcoin.com/thai-startup-atomicpay-launches-non-custodial-crpto-payment-platform/ Jan. 12, 2019.

Petersen, Cole, "Coinbase Commerce Announces Addition of New Features, Faces Increasing Competition", Cryptocurrency Technology, Aug. 3, 2018, (https//www.newsbtc.com/category/crypto-tech/).

Strelov, Aleksandr, "Accepting payments in Ethereum and ERC20 tokens", steemit, https://steemit.com/cryptocurrency/@ivelon/accepting-payments-in-ethereum-and-erc20-tokens.

Extended European Search Report issued in European Application No. 21826681.5 on May 3, 2024.

* cited by examiner

SYSTEMS AND METHODS FOR CONVERTING CRYPTOCURRENCY

CROSS-REFERENCE TO RELATED APPLICATIONS

This application claims the benefit of U.S. Provisional Application No. 63/040,360 filed 17 Jun. 2020 and U.S. Provisional Application No. 63/067,556 filed 19 Aug. 2020, each of which is incorporated in its entirety by this reference.

TECHNICAL FIELD

Variants of this invention relates generally to the blockchain field, and more specifically to a new and useful technology for facile cryptocurrency conversion in the blockchain field.

BACKGROUND

Currently, users can receive payments in a variety of different cryptocurrencies. Unfortunately, these cryptocurrencies are not interchangeable—for example, Bitcoin cannot be used to pay for a DAI transaction, which causes value to be trapped in small-balance wallets. Furthermore, managing a large variety of cryptocurrencies is oftentimes extremely difficult, and exposes the user to a large amount of financial risk due to each cryptocurrency's own market and volatility.

While it is possible for cryptocurrencies to be manually converted into a settlement asset (e.g., stable cryptocurrency), the process is extremely slow and time consuming. This is exacerbated when the cryptocurrencies are not custodied (e.g., held, controlled, or managed) by the converting system (e.g., exchange), since the user needs to individually withdraw each cryptocurrency on the cryptocurrency's respective blockchain and wait for the transactions to settle before conversion, adding time and additional steps to the conversion process.

Thus, there is a need in the blockchain field to create a new and useful technology for facile cryptocurrency conversion.

BRIEF DESCRIPTION OF THE FIGURES

FIG. 8 is an example of a user interface for connecting the client to the conversion system, such that the client can retrieve settlement addresses on behalf of the user from the conversion system.

FIG. 9 is an example of a user interface displaying a single action indicator.

DETAILED DESCRIPTION

The following description of the embodiments of the invention is not intended to limit the invention to these embodiments, but rather to enable any person skilled in the art to make and use this invention.

Figure 1:
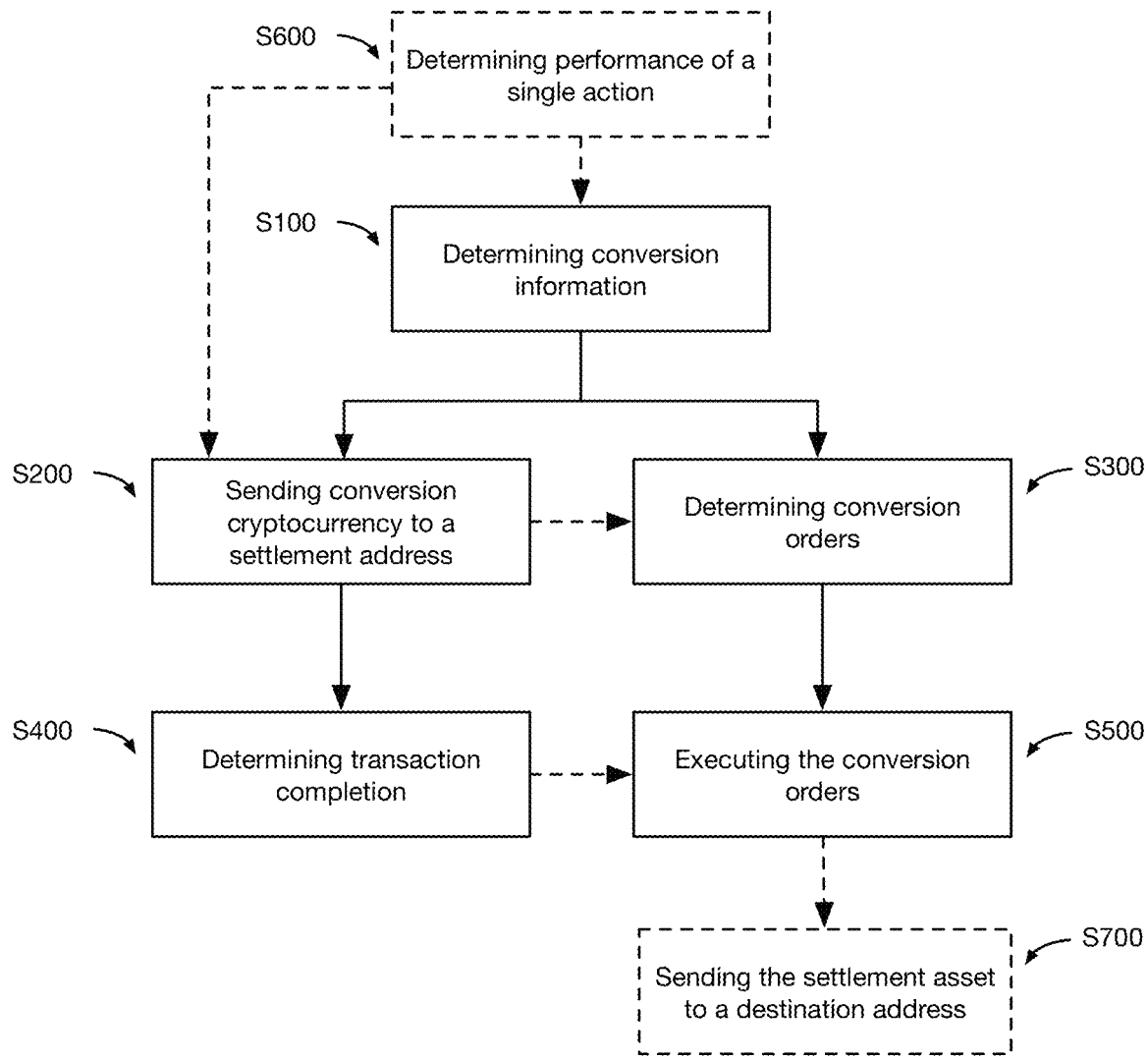
FIG. 1 is a flowchart representation of an example method.

As shown in FIG. 1, variants of the method for cryptocurrency conversion includes: determining conversion information S100; sending the cryptocurrency to a settlement address S200; determining conversion orders S300; determining transaction completion S400; and executing the conversion orders S500.

The variants of the method function to enable facile cryptocurrency conversion while preserving private key security and user agency over their assets. In variants, the technology can enable automatic cryptocurrency conversion with minimal user input (e.g., enable single-action, one-click, or no-action cryptocurrency conversion).

Conventionally, users need to: manually find the settlement address for withdrawal; manually generate unsigned transactions for each cryptocurrency to convert; manually find the private key for each cryptocurrency; individually sign the unsigned transaction for each cryptocurrency; individually broadcast the signed transactions to the respective blockchains; manually monitor each transaction for blockchain settlement; manually create conversion orders; manually submit the conversion orders for trading; and manually monitor the trade status. Because of the long delay in blockchain confirmation times (especially when low network fees are specified), and the large number of cryptocurrencies that need to be managed, this process is extremely onerous and time consuming.

Variants of the technology can significantly decrease user overhead and conversion time by batch signing the unsigned transactions, creating a mapping between the blockchain transaction and the conversion orders, automatically coordinating between the client, trading system, and blockchain, and/or automatically generating the transactions, conversion orders, and facilitating transaction and order execution.

However, further advantages can be provided by the system and method disclosed herein.

In an illustrative example (e.g., example of a flowchart shown in FIG. 3), the method includes: in response to performance of a single action (e.g., receipt of a user confirmation at a client): signing a batch of unsigned blockchain transactions, each sending a cryptocurrency to an exchange address (e.g., with a user private key controlled by the user); broadcasting each signed blockchain transaction to the respective blockchain of the conversion cryptocurrency; monitoring the blockchains for settlement of the respective blockchain transaction (e.g., at a node for each blockchain); coordinating with a trading system to create a conversion order for each of the blockchain transactions; and executing the conversion orders (e.g., in response to blockchain transaction settlement) to convert each conversion cryptocurrency to a settlement asset. The method can optionally include (e.g., in response to the single action, or before the single action): determining conversion information (e.g., conversion cryptocurrency, settlement asset, transaction amount, settlement address, network speed, etc.) and creating a batch of unsigned transactions based on the conversion information. The method can optionally include (e.g., still in response to the performance of the single action): generating a secondary unsigned transaction sending the settlement asset to a destination address; signing the secondary unsigned transaction (e.g., with a custodial private key controlled by a custodian system); and broadcasting the signed secondary transaction on the blockchain of the settlement asset (e.g., to transfers control of the asset back to the user). In this illustrative example, the method can be wholly performed without user intervention or input (e.g., after the single action). In this illustrative example, the method can automatically convert a batch of cryptocurrencies based on different protocols, different blockchains, and/or having different private keys. For example, the batch can include both UTXO-based assets (e.g., Bitcoin, etc.) and account-based assets (e.g., Litecoin, ERC20 tokens, Ethereum, etc.).

However, the method can be otherwise performed.

1. System.

Variants of the method can be performed using a set of blockchain addresses and/or accounts. A blockchain account can include one or more blockchain addresses (e.g., cryptographically deterministically related to the underlying blockchain addresses), be a hierarchical deterministic wallet (HD wallet), and/or be otherwise defined. A blockchain address can represent an entity on the blockchain but can be otherwise used. The blockchain address can be: a public key, be derived from a public key, or otherwise configured.

A blockchain account is preferably associated with a single entity, but can alternatively be associated with multiple entities. Each entity can be associated with one or more blockchain accounts (e.g., one or more for each cryptocurrency, one or more for each blockchain, etc.). Each blockchain account can be associated with one or more entities. For example, the custodian system can control a blockchain account, which can include one or more blockchain addresses (e.g., settlement addresses), each associated with different users. The custodian system can be the conversion system (e.g., an exchange, wherein the settlement addresses are exchange addresses), a third party system that interfaces with the conversion system, and/or any other suitable system. Alternatively, each blockchain address can be shared across multiple users, wherein transactions received at the blockchain address can be disambiguated using a nonce or metadata in the blockchain transaction, a fingerprint (e.g., a transaction hash), the transaction amount, the submission timestamp, and/or any other suitable identifying information tying the on-chain settled transaction to the user.

Each blockchain account and/or address can be: specific to a user, shared across users, specific to a transaction, shared across transactions, specific to a cryptocurrency (e.g., different addresses for DAI and ETH), shared across cryptocurrencies, specific to a blockchain (e.g., an ETH address, wherein all ERC20 tokens are held by the ETH address; a separate Bitcoin address; etc.), shared across blockchains (e.g., the same address is used for EH and BTC transactions), specific to the conversion use case (e.g., all transactions received at the address are converted), shared across multiple use cases (e.g., only some transactions received at the address are converted), and/or otherwise specific or shared.

Variants of the blockchain accounts (and addresses therein) can be controlled by a private key (paired with or a parent of the public key), which is used to sign transactions out of the paired account and/or address. The private key can be cold stored (e.g., stored offline, stored in paper, etc.), stored in hot storage (e.g., stored in a connected repository, such as cloud storage or a local password manager), stored in an HSM (hardware security module), stored in a secure enclave of a user device (e.g., mobile device, laptop, etc.), and/or otherwise stored. In one example, the keys can be stored and/or retrieved using one or more of the methods disclosed in U.S. application Ser. No. 17/044,121 filed 17 Apr. 2019 and/or U.S. application Ser. No. 17/072,395 filed 16 Oct. 2020, each of which is incorporated herein in their entireties by this reference, or otherwise cold-storing the keys. In another example, the keys can be stored and/or retrieved using the method disclosed in U.S. application Ser. No. 16/452,195 filed 25 Jun. 2019, which is incorporated herein in its entirety by this reference, or otherwise stored in connected storage. However, the private keys can be otherwise stored and/or retrieved.

Variants of the private key are preferably controlled by the entity, wherein only the entity is authorized to access the private key. In a first example, only the entity has access to the HSM or user device. In a second example, private key access is controlled by an authentication system, such as a biometric system or an out-of-band authentication system (e.g., 2-factor authentication, mobile authentication, email confirmation, mobile device confirmation, etc.). However, transaction signing can be controlled using multi-party computation (MPC), using a multisignature scheme, and/or otherwise controlled.

In variants, the method is used with a set of noncustodial blockchain accounts (e.g., conversion accounts), each controlled by a different user private key that is controlled by a different user. The conversion accounts can include one or more types of cryptocurrency. The method can also be used with a set of custodial blockchain accounts (e.g., settlement account), each controlled by a different custodial private key (e.g., settlement private key, conversion system private key) that is controlled by a custodial system (e.g., the conversion system, the asset management system or cryptocurrency platform, etc.), wherein each custodial blockchain account can hold assets on behalf of a pool of users (e.g., plurality of users). When the custodial blockchain account is shared between users, each user can be associated with one or more settlement addresses belonging to the custodial blockchain account, wherein the respective custodial private key can control each of said settlement addresses. The settlement account can hold one or more types of cryptocurrency. When a custodial blockchain account is used, the user's balance for each cryptocurrency can be tracked in an offchain ledger or otherwise tracked. However, the method can be used with any other suitable set of blockchain accounts.

In variants, a user can have a set of noncustodial blockchain accounts, controlled by the user (e.g., the user controls the private key for the noncustodial blockchain accounts). A user can also have an offchain user account on the custodial system, wherein the offchain user account can be associated with a user balance for each conversion cryptocurrency, tracked by an offchain ledger of the custodial system, that corresponds to the amount of conversion cryptocurrency attributed to the user but controlled by the custodial system's set of custodial blockchain accounts. The offchain user account can also be associated with a set of settlement addresses, auxiliary data, conversion orders, and/or other information.

Variants of the method can be used with a set of blockchain transactions, which function to send an amount of cryptocurrency from a sending blockchain address to a recipient blockchain address via the respective blockchain. The blockchain transaction can include: a sending address, a recipient address, the cryptocurrency type, the amount, an optional nonce (e.g., used by the trading system to identify the transaction; used by the client to track different transactions sent to the same blockchain, etc.), a function call (e.g., for ERC20 tokens, to instruct the ERC20 smart contract to send the token to the recipient address, etc.), and/or other information. The blockchain transaction is preferably signed using the private key of the sending address, such that the respective blockchain can verify the signature and settle the transaction.

Variants of the method can be used with a set of cryptocurrencies. The cryptocurrencies can be associated with different: blockchains, protocols, smart contracts, and/or otherwise differ. Alternatively, all or some of the cryptocurrencies can share blockchains, protocols, smart contracts, and/or other aspects. The cryptocurrencies can include: UTXO-based assets (e.g., Bitcoin, etc.), account-based assets (e.g., Litecoin, ERC20 tokens, Ethereum, etc.), and/or other types of cryptocurrencies. Examples of cryptocurrencies that can be used include: Bitcoin, Bitcoin Cash, Litecoin, Ethereum, Ethereum Classic, XRP, Stellar Lumens, Dogecoin, ERC-20 tokens (including USDC and DAI), Polkadot, Uniswap, Solana, Theta, EOS, Monero, IOTA, Shiba Inu, Algorand, Cosmos, and/or other cryptocurrencies.

In variants, the method can interact with conversion cryptocurrencies, which are the cryptocurrencies to be converted to the settlement asset, and settlement assets, which are the target asset after conversion completion. The settlement assets can be: cryptocurrencies (e.g., large-market-cap currencies, stablecoins, a user-specified cryptocurrency, any of the cryptocurrencies discussed above, etc.), fiat (e.g., USD, Yen, etc.), commodities (e.g., gold, silver, etc.), equities (e.g., stocks), bonds, ETFs, mutual funds, and/or any other suitable financial instrument or representation of value. Additionally or alternatively, other representations of value can be used in lieu of the conversion cryptocurrencies.

Figure 2:
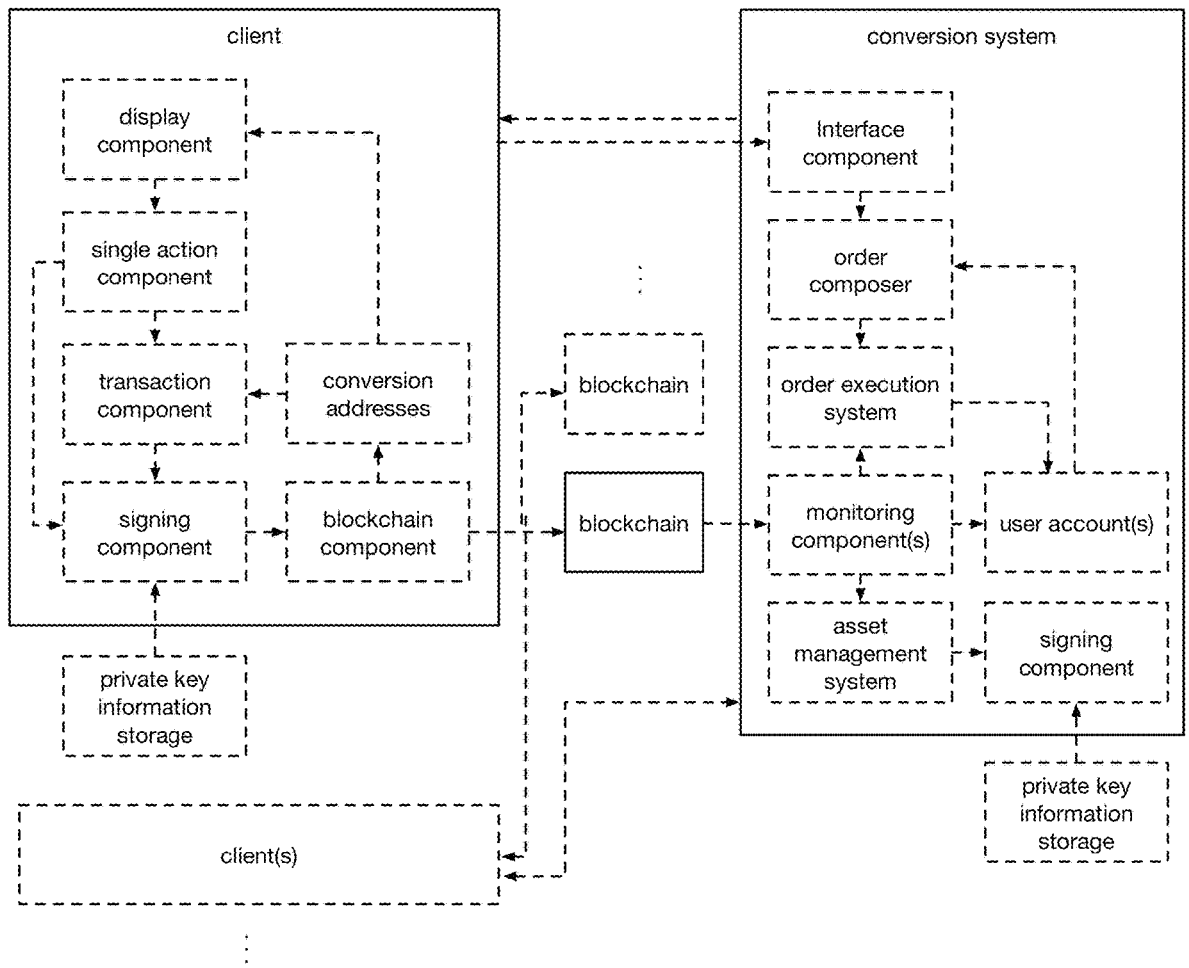
FIG. 2 is a schematic representation of an example system.

Variants of the method can be wholly or partially executed using a system (e.g., shown in FIG. 2) including a set of clients, a conversion system, and/or other components. The system is preferably an off-chain system, but can alternatively be an on-chain system (e.g., execute wholly or partially on a blockchain).

Variants of the client functions to perform conversion cryptocurrency selection, private key retrieval, blockchain transaction generation, signing, broadcasting, and/or coordination with the conversion system, and/or perform other functionalities. The client can also function as a user interface. The client can be: a web application, a browser application or plugin, an upstream application from the conversion system (e.g., within the same platform), a wallet, a smart contract, and/or otherwise configured. The client can include: a display component that displays conversion information (e.g., conversion cryptocurrency identifiers, settlement asset identifiers, amounts, network fees, network speed, etc.) and/or displays information indicative of the single action; a transaction management component that generates unsigned versions of the blockchain transactions and/or retrieves the private keys for each respective conversion address (e.g., before performance of the single action); optionally a single action component that, responsive to performance of only a single action, facilitates performance of a remainder of the cryptocurrency conversion process; a transaction component that generates the blockchain transactions as a batch; a signing component that signs the unsigned transactions using the private keys (and optionally stores the private keys); a set of blockchain components that broadcast the blockchain transactions to the respective blockchains and optionally read information off said blockchains; and a request component (e.g., coordination component) that sends a conversion request to the conversion system to coordinate conversion order creation and execution; and/or any other suitable component. The system can include one or more clients (e.g., one for each user).

Variants of the conversion system functions to provide the settlement address(es), determine transaction completion, custody the conversion cryptocurrencies on behalf of the users, execute the conversion orders, custody the settlement assets on behalf of the users, and/or perform other functionalities. The conversion system preferably supports multiple users, but can alternatively support a single user. The conversion system can include one or more of: multiple user accounts that store user conversion preferences (e.g., preferred settlement asset, maintained cryptocurrency minimums, conversion schedule, etc.), the associated transaction identifiers (e.g., transaction hash, settlement address, nonces, etc.), the user balance, authentication credentials (e.g., username, password, API tokens, etc.), and/or other information; an interface component (e.g., API) that receives the conversion information (e.g., conversion request; information needed to compose the conversion order and associate the conversion order with a transaction; a conversion request; etc.) from the client(s); an order composer that composes the conversion orders based on the conversion information; one or more monitoring components that monitor each blockchain (e.g., at a blockchain node for the blockchain) for information indicative of transaction completion; an order execution system (e.g., trading system) that executes conversion orders to exchange each conversion cryptocurrency for the settlement asset; an asset management system (e.g., cryptocurrency platform) that custodies assets (e.g., the conversion cryptocurrencies, the settlement asset, etc.) on behalf of the users; a signing component that signs withdrawal transactions to external addresses; and/or any other suitable component. The order execution system is preferably a centralized exchange, but can alternatively be a decentralized exchange (DEX).

Variants of the system can additionally or alternatively include one or more sets of smart contracts (e.g., in lieu of the client), wherein the smart contracts can be deployed on the conversion cryptocurrencies' blockchains. In this variation, the smart contract receives the conversion cryptocurrencies sharing the blockchain (e.g., the conversion address identifies the smart contract), and can automatically send the conversion cryptocurrencies to the settlement account. The settlement account can be a configuration in the smart contract (e.g., set by a smart contract administrator), received as part of the transaction sending the conversion cryptocurrency to the smart contract, and/or otherwise determined. The smart contract can also trigger conversion by emitting a blockchain event (e.g., in an atomic transaction with conversion cryptocurrency receipt and transmitting to the settlement account). The blockchain event can be conversion cryptocurrency transfer to the settlement account or another blockchain event. In this variation, the conversion system monitors the blockchain for the blockchain event, and creates the conversion orders in response to blockchain event detection. For example, each smart contract can be associated with an individual merchant invoice (e.g., having a noncustodied address), wherein the smart contract can be configured to flush any received payments to a merchant-specific settlement address custodied by the conversion system. When the conversion system receives payment at the settlement address, the conversion system can automatically generate a conversion order (e.g., based on conversion information previously specified by the merchant) to convert the payment to the settlement asset on behalf of the merchant. In a second example, the system can operate similarly to the first example, except that the smart contract is deployed at the settlement address (e.g., specific to the merchant) and/or the settlement address is used in lieu of the smart contract. However, the system can otherwise incorporate one or more smart contracts.

However, the system can include and/or interact with any other suitable set of components.

2. Method

As shown in FIG. 1, variants of the method for cryptocurrency conversion includes: determining conversion information S100; sending the cryptocurrency to a settlement address S200; determining conversion orders S300; determining transaction completion S400; and executing the conversion orders S500. In variants, all or portions of the method can be performed responsive to determination of a single action S600.

Variants of the method function to automatically convert cryptocurrencies to another asset, wherein the converted asset can be available for use on the conversion system (e.g., exchange) or another system (e.g., noncustodial wallet, etc.); alternatively, cryptocurrencies can be withdrawn from the conversion account without conversion.

Variants of the method are preferably performed by all or a portion of the system discussed above, but can be performed by any other suitable system.

All or a portion of the method can be performed: when the assets arrive at the conversion address (e.g., when the send transactions are confirmed on-chain); when the assets arrive at the settlement address; when a user request is received (e.g., instruction to initiate conversion); when a single action is performed (e.g., when the user selects a "confirm" button); periodically; when a predetermined event occurs (e.g., a predetermined blockchain address); and/or at any other suitable time.

A single instance of the method is preferably performed for multiple cryptocurrencies held by a given user account (e.g., conversion account); however, individual method instances can be performed for different cryptocurrencies selected for conversion.

Figures 8, 9:
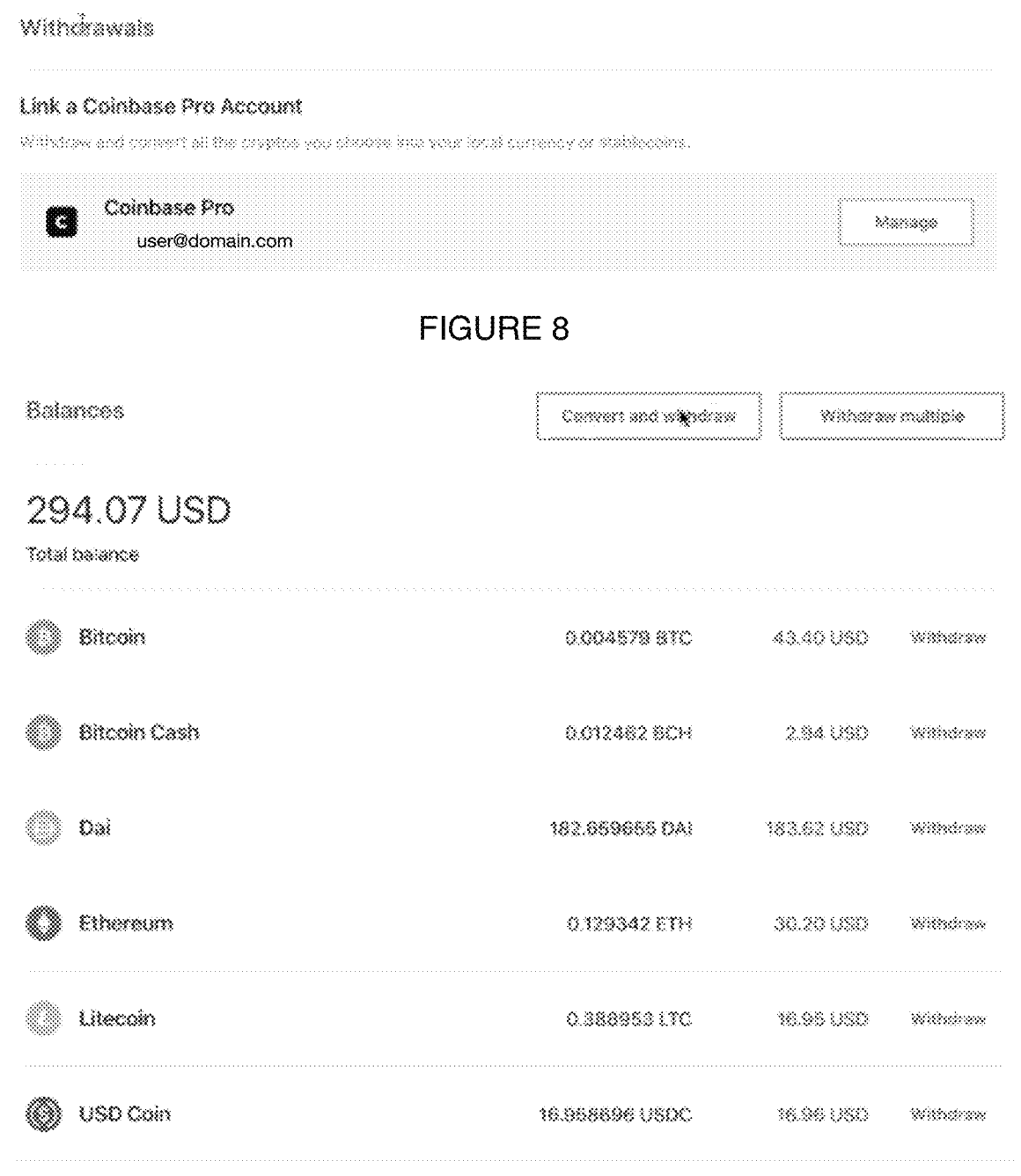

Determining conversion information S100 functions to specify the parameters to use for conversion, such as which cryptocurrencies should be converted, what they should be converted to, and/or how they should be converted. All or a portion of the conversion information can be automatically determined; manually determined; and/or otherwise determined. All or a portion of the conversion information can be predetermined and sorted as a set of conversion preferences; received as part of a request for each conversion; and/or determined at any other suitable time. All or a portion of the conversion information can be calculated; retrieved from the conversion system (e.g., using a preestablished connection, a set of authentication information, such as an API key, an access token, a login, etc.; example shown in FIG. 8), an oracle, or another source; and/or otherwise determined.

S100 is preferably performed by the client, but can alternatively be entirely or partially performed by the conversion system or other component.

S100 is preferably performed before S200, but can alternatively be performed after parts of S200, or performed at any other suitable time.

Figure 4:
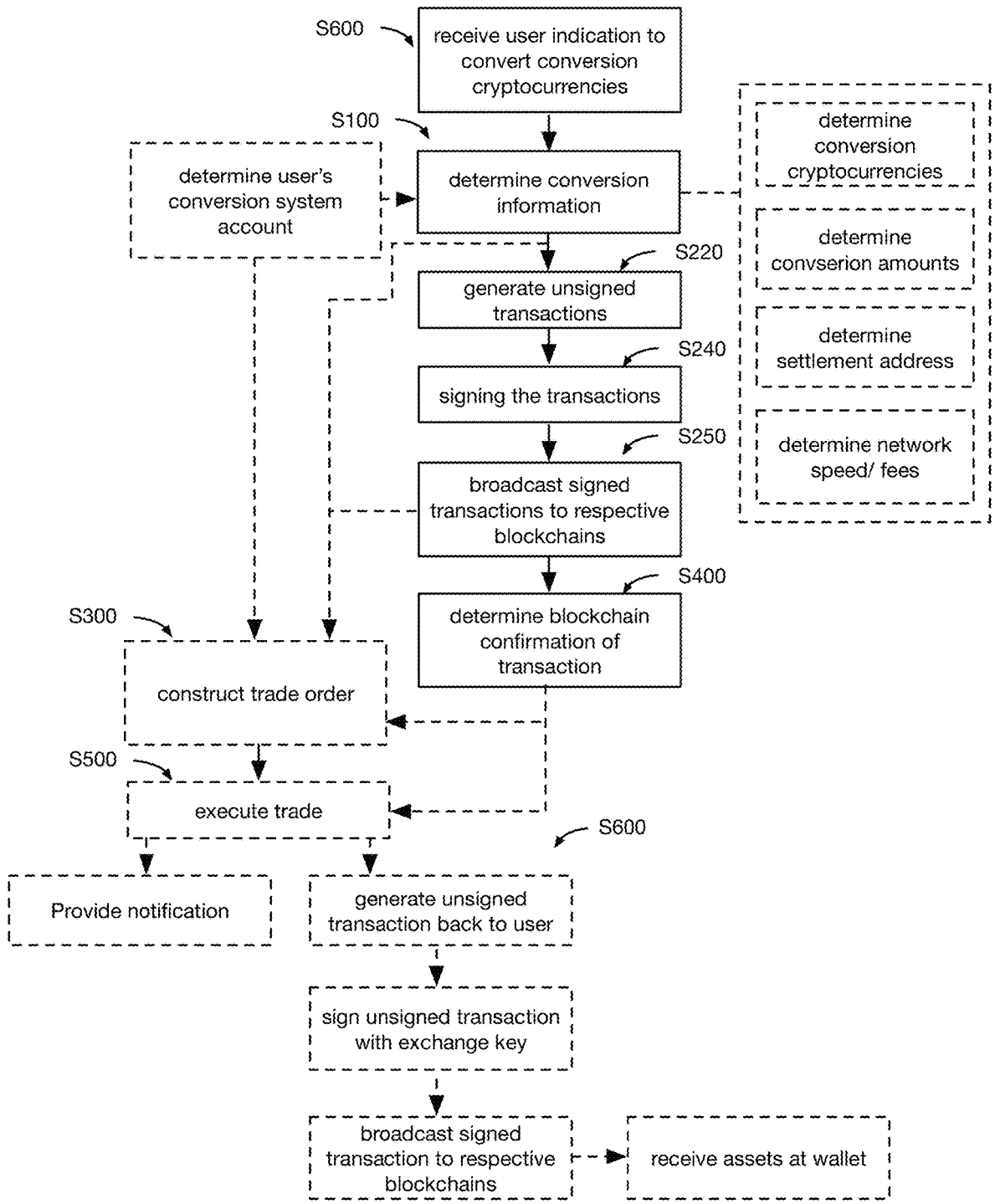
FIG. 4 is a flowchart representation of a second example of the method.
Figure 7:
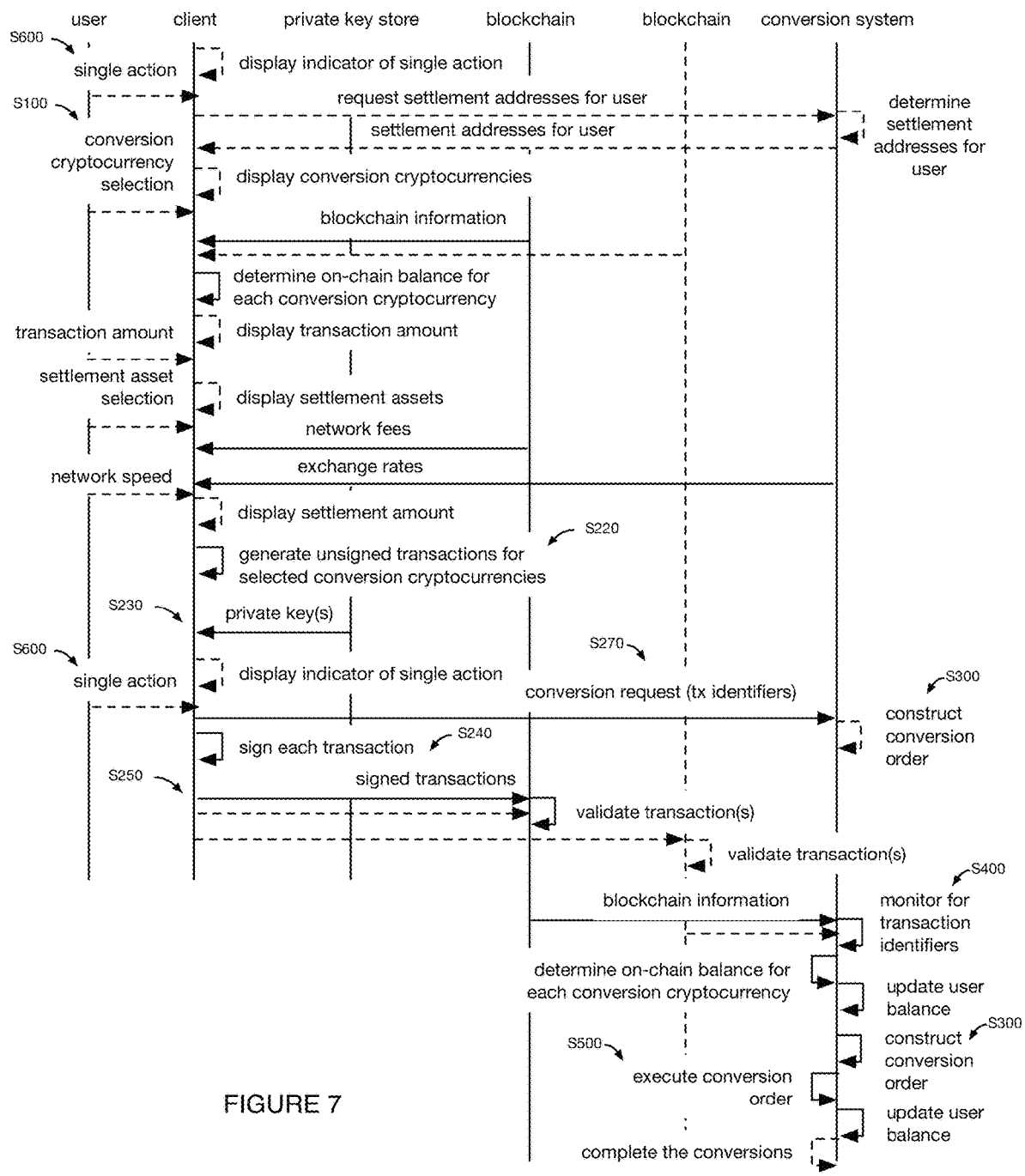
FIG. 7 is a schematic representation of an example of the method.

The conversion information can include: the cryptocurrency to convert (e.g., the conversion cryptocurrency), the settlement asset, the transaction amount (e.g., initial conversion amount), the exchange rate, the network speed and/or network fees, the system fees, the settlement amount, the conversion account (e.g., holding the cryptocurrency), the settlement address(es) (e.g., for each conversion, each conversion cryptocurrency, each unique blockchain of the conversion cryptocurrency set, etc.), and/or other information, examples shown in FIG. 4 and FIG. 7. The same or different conversion information values can be used for different cryptocurrencies held by a user (e.g., the client instance). The conversion cryptocurrency can be: predetermined, selected by a user (e.g., at the client), or otherwise determined.

The settlement asset can be specified by the system, selected by the user (e.g., at the client), predetermined, or otherwise determined.

The transaction amount can be the amount of conversion cryptocurrency to be converted, and can be specified by the user (e.g., entered, etc.; example shown in FIG. 7), be the balance of the conversion account holdings (e.g., on-chain balance; example shown in FIG. 7), be predetermined (e.g., a predetermined amount that is scheduled for periodic conversion), and/or otherwise determined.

The exchange rate is preferably for the conversion cryptocurrency-settlement asset pair, but can be for any other suitable asset pair. The exchange rate can be retrieved from the trading system (e.g., via an API; example shown in FIG. 7), determined from a signed price feed provided by the trading system (e.g., signed by the custodial private key, signed by the trading system's private key, etc.; provided via an oracle, via an API, or via another datasource), determined from an oracle (e.g., an on-chain or off-chain source), estimated (e.g., based on historical data) and/or otherwise determined. In a specific example, the signed price feed can be generated, verified, and/or provided in the manner disclosed in U.S. Provisional Application No. 63/042,834 filed 23 Jun. 2020 and titled "System and Method for Providing Data Feeds", which is incorporated herein in its entirety by this reference; however, the signed price feed can be generated in any other suitable manner.

The network fees (e.g., fees required for a blockchain network to process the transaction, such as gas, satoshis, etc.) can be: retrieved from a network fee monitoring system, from the respective blockchain, estimated (e.g., based on current or anticipated transaction volume), received from a user (e.g., as a maximum fee, a network speed associated with a predetermined fee value or range, etc.; example shown in FIG. 7), or otherwise determined.

The system fees (platform fees) can be: a set value or proportion (e.g., 0.5%), be retrieved from the system, and/or otherwise determined.

The conversion information can optionally include the settlement amount, which can be the estimated or actual amount of settlement asset (and/or settlement asset value) after conversion (example shown in FIG. 7). The settlement amount can be calculated as the transaction amount, less the network fees, less the system fees, and converted to the settlement asset (e.g., using the exchange rate), but can be otherwise calculated. The settlement amount can be: per conversion cryptocurrency, be the aggregate value of the settlement amounts for all the cryptocurrencies to be converted, and/or include other values. Alternatively, the settlement amount can be: estimated, looked up (e.g., from a lookup table), and/or otherwise determined. The settlement amount is preferably determined in real- or near-real time (e.g., all the underlying information is retrieved and the settlement amount calculated when the conversion flow is initiated), but can alternatively be determined periodically (e.g., once a day, once every 30 seconds, once every minute, etc.), determined responsive to a user request, and/or determined at any other suitable time.

The conversion address is preferably the blockchain account holding the conversion cryptocurrency (e.g., known to and/or stored by the client), but can be another address. The conversion address is preferably from a noncustodial account or user-controlled blockchain account, but can alternatively be from a custodied account or conversion system-controlled account.

The settlement address is preferably a blockchain account controlled by the conversion system, but can alternatively be another account. The settlement address can be: provided by the conversion system (e.g., for the conversion, for the user, etc.; example shown in FIG. 7), a predetermined settlement address (e.g., a settlement address for the conversion system that is retrieved from a public source), and/or otherwise determined. The settlement address can be a generic settlement address shared across all users or a user-specific settlement address. The settlement address can be a generic settlement address shared across all conversion cryptocurrencies or blockchains, or be a blockchain- or conversion cryptocurrency-specific settlement address. The settlement address can be shared across multiple conversion instances or transactions (e.g., for the same or different users), or be specific to a conversion instance or transaction. In a first example, the settlement address can be specific to each user and each conversion instance, wherein the settlement address can be used as the transaction identifier in S400. In a second example, the settlement address can be shared across users, wherein additional identifying information is used to disambiguate different users' funds in S400. In a third example, the settlement address is specific to each blockchain, such that ERC20 tokens and ETH share a common settlement address, but BTC uses a different settlement address. In a fourth example, the settlement address is shared across different use cases (e.g., for the user or the conversion system), wherein the conversion request sent to the conversion system specifies that the funds associated with a transaction identifier are to be automatically converted. In a fifth example, conversion system includes a different settlement address for each conversion cryptocurrency. However, the settlement address can be otherwise configured.

The conversion information can optionally include order parameter values. Order parameter values can include: order type (e.g., market, limit order, stop loss, stop limit, trailing stop loss, etc.), time in force (e.g., good till cancelled, fill or kill, immediate or cancel, on the open, on the close, day, etc.), and/or other parameter values. The order parameter values can be determined automatically (e.g., by the client, by the conversion system, etc.) or manually (e.g., wherein the user selects the order parameter values when they select the conversion cryptocurrency and/or conversion amount; wherein the user sets the order parameter values as part of their conversion configuration; etc.). However, the order parameter values can be otherwise determined.

Figure 10A:
FIG. 10A is an example of a user interface for conversion cryptocurrency selection.
Figure 10B:
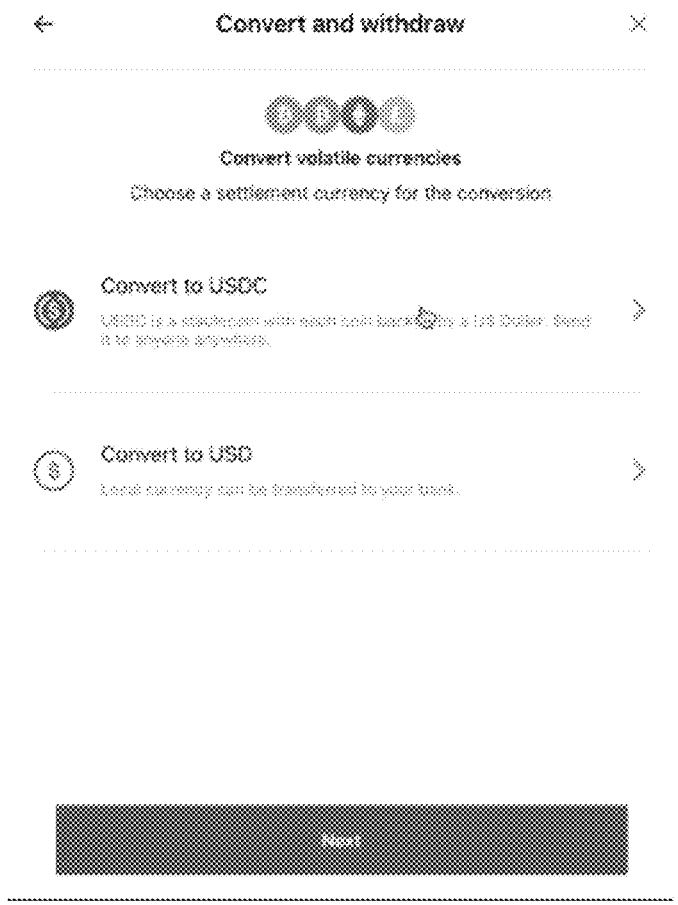
FIG. 10B is an example of a user interface for settlement asset selection.
Figure 10C:
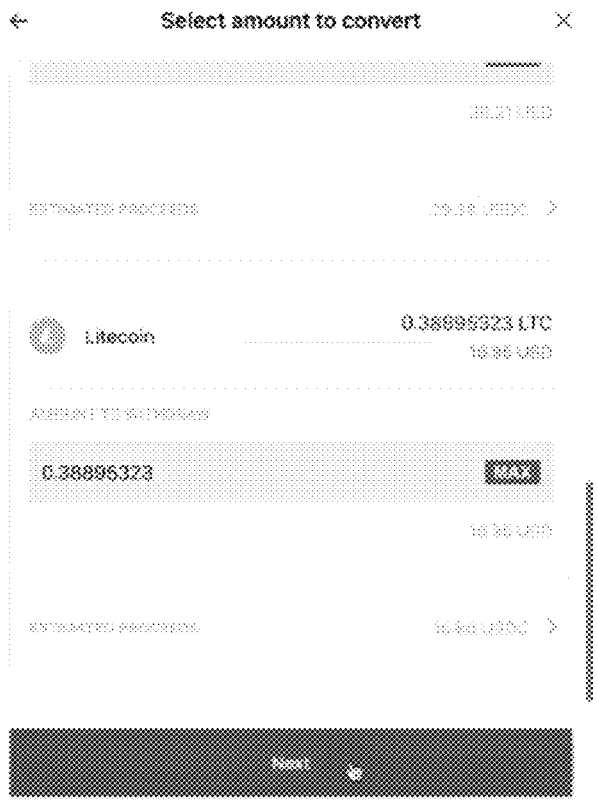
FIG. 10C is an example of a user interface for transaction amount specification.

In a first variation, S100 includes receiving the conversion information from the user (e.g., in response to user indication to initiate the conversion process, such as selection of a "convert" or "begin conversion" icon. This can include: displaying a set of conversion cryptocurrencies (e.g., illustrative example shown in FIG. 9 and FIG. 10A) and receiving a user selection or entry of which conversion cryptocurrencies to convert (e.g., illustrative example shown in FIG. 10A). The displayed conversion cryptocurrencies can be: those supported by the system, those owned by the user (e.g., accessible by the user's wallet, controlled by the user's private key), and/or any other suitable conversion cryptocurrency. The user's conversion cryptocurrency balance for each conversion cryptocurrency can also be displayed. In one embodiment of the first variation, the settlement asset can be automatically determined (e.g., when the system only supports one settlement asset; wherein the settlement asset is a default settlement asset; etc.). In a second embodiment, this variation can include displaying a set of possible settlement assets (e.g., supported by the system; illustrative example shown in FIG. 10B) and receiving a user selection or entry of one or more settlement assets. However, the settlement asset can be otherwise determined. The transaction amount (e.g., amount of conversion cryptocurrency to be converted) can be entered by a user, be the full amount of the user's selected conversion cryptocurrency's balance (e.g., on-chain balance; illustrative example shown in FIG. 10C), be the amount of the user's conversion cryptocurrency balance above a user-specified minimum or maximum, be otherwise determined, and/or not be displayed or determined. In this variation, the settlement amount for each conversion cryptocurrency or the set of conversion cryptocurrencies can optionally also be displayed (e.g., for user confirmation; examples shown in FIG. 10C and FIG. 7), wherein the settlement amount can be determined as discussed above. In a specific example, this can include: retrieving the network fees for each conversion cryptocurrency blockchain from a network fee tracker (e.g., Etherscan™); retrieving the exchange rates for each conversion cryptocurrency-settlement asset pair from the conversion system (e.g., via an API or a signed price feed); and calculating the settlement amount. Alternatively, the user can enter the target settlement amount, and the client can automatically determine the combination of conversion cryptocurrencies to convert to achieve the target settlement amount (e.g., based on each conversion cryptocurrency's balance, network fee, exchange rate, and optionally platform fee), using an optimization, guess-and-check, or other method. This variation can also include retrieving the conversion addresses from client storage. This variation can also include determining the settlement address, which can include: receiving the settlement address from the user (e.g., wherein the user enters the settlement address string), automatically retrieving the settlement address from the conversion system (e.g., accessed via access credentials provided by the user; example shown in FIG. 7), retrieving a predetermined address (e.g., wherein the system only has a single settlement address), and/or otherwise determining the settlement address. In this variation, the user can optionally select the network speed or specify the network fee they're willing to pay, wherein the current or estimated network fee (e.g., retrieved when calculating the settlement amount) can be displayed or hidden. Alternatively, the network fee can be fixed (e.g., by the system) or otherwise determined.

In a second variation, at least part of the conversion information (e.g., the conversion addresses, conversion cryptocurrency selections, settlement address, etc.) can be determined from a conversion configuration, wherein the conversion configuration can be set in a similar manner to the first variation. In one embodiment, the conversion configuration is stored by the client. In a second embodiment, the conversion configuration is stored by the smart contract, wherein the configuration information values can be received in a similar manner to the first variation, and a signed transaction setting the conversion configuration values to the selected values can be sent by the smart contract's managing entity (e.g., the conversion system, etc.).

In a third variation, all or part of the conversion information is automatically determined based on default settings (e.g., set by the user or the system).

However, any other suitable conversion information can be otherwise determined.

Sending the cryptocurrency to a settlement address S200 functions to withdraw the conversion cryptocurrencies to the conversion system by sending the set of conversion cryptocurrencies (e.g., plurality of conversion cryptocurrencies) to a set of settlement addresses (e.g., associated with the conversion system).

S200 is preferably performed by the client, but can alternatively be performed by a smart contract (e.g., receiving the conversion cryptocurrency), by the conversion system (e.g., receiving the conversion cryptocurrency), and/or any other suitable system.

S200 is preferably performed after S100 and before S400, but all or parts of S200 can alternatively be performed before S100. All or parts of S200 can be performed before, after, and/or contemporaneously with S300. A different instance of S200 is preferably performed for each conversion instance, but different conversion instances can alternatively share S200 instances. A single instance of S200 is preferably performed for each conversion instance (e.g., for a batch of conversion cryptocurrencies), but multiple instances of S200 can alternatively be performed for a conversion instance (e.g., different S200 instances for different conversion cryptocurrencies).

Figure 3:
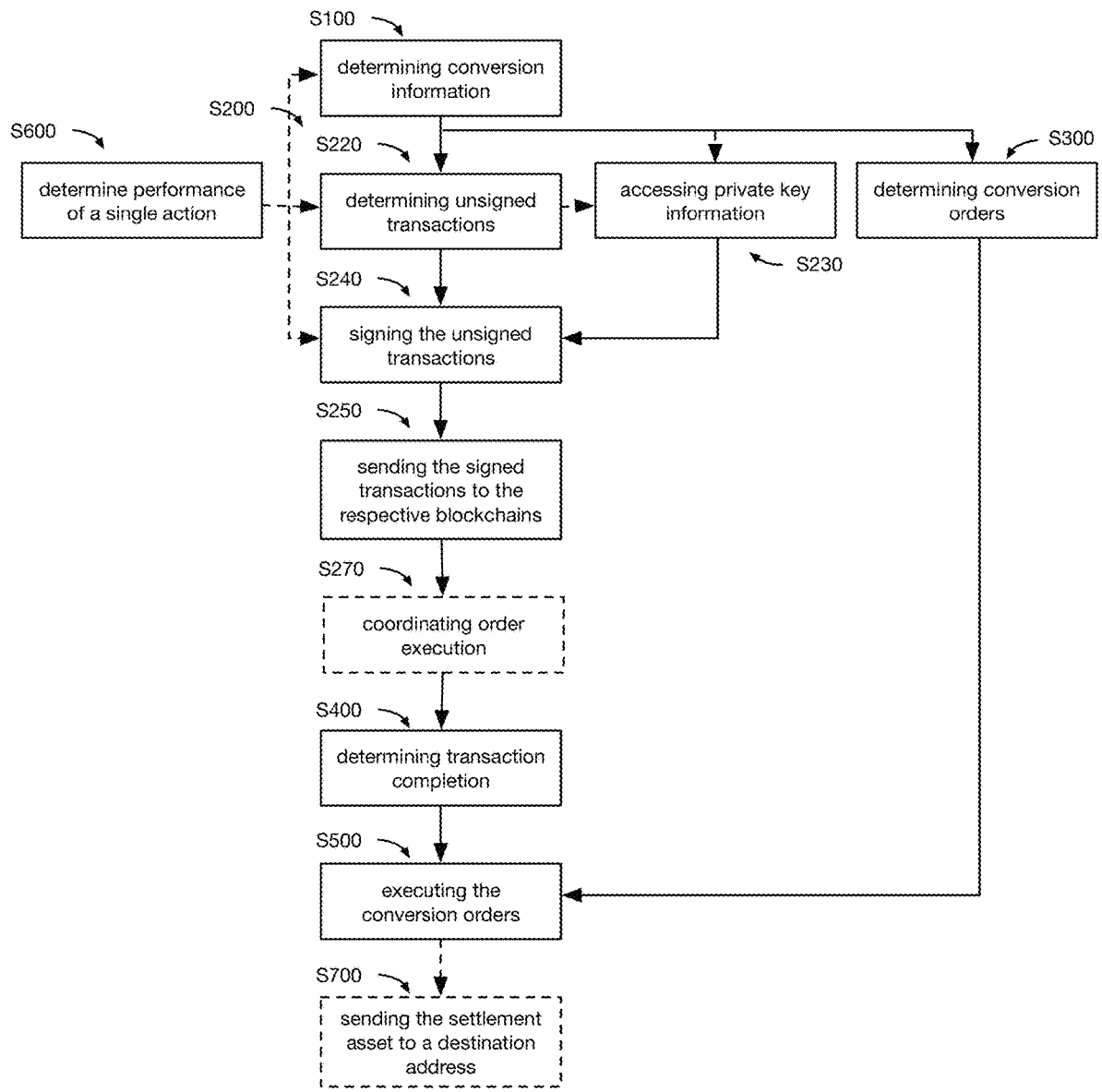
FIG. 3 is a flowchart representation of an example of the method.

S200 can include: determining unsigned versions of the blockchain transactions S220; accessing private key information S230; signing the unsigned transactions using the respective private key information S240; and sending the signed transactions to the respective blockchains S250, example shown in FIG. 3. However, the S200 can be otherwise performed.

Figure 5:
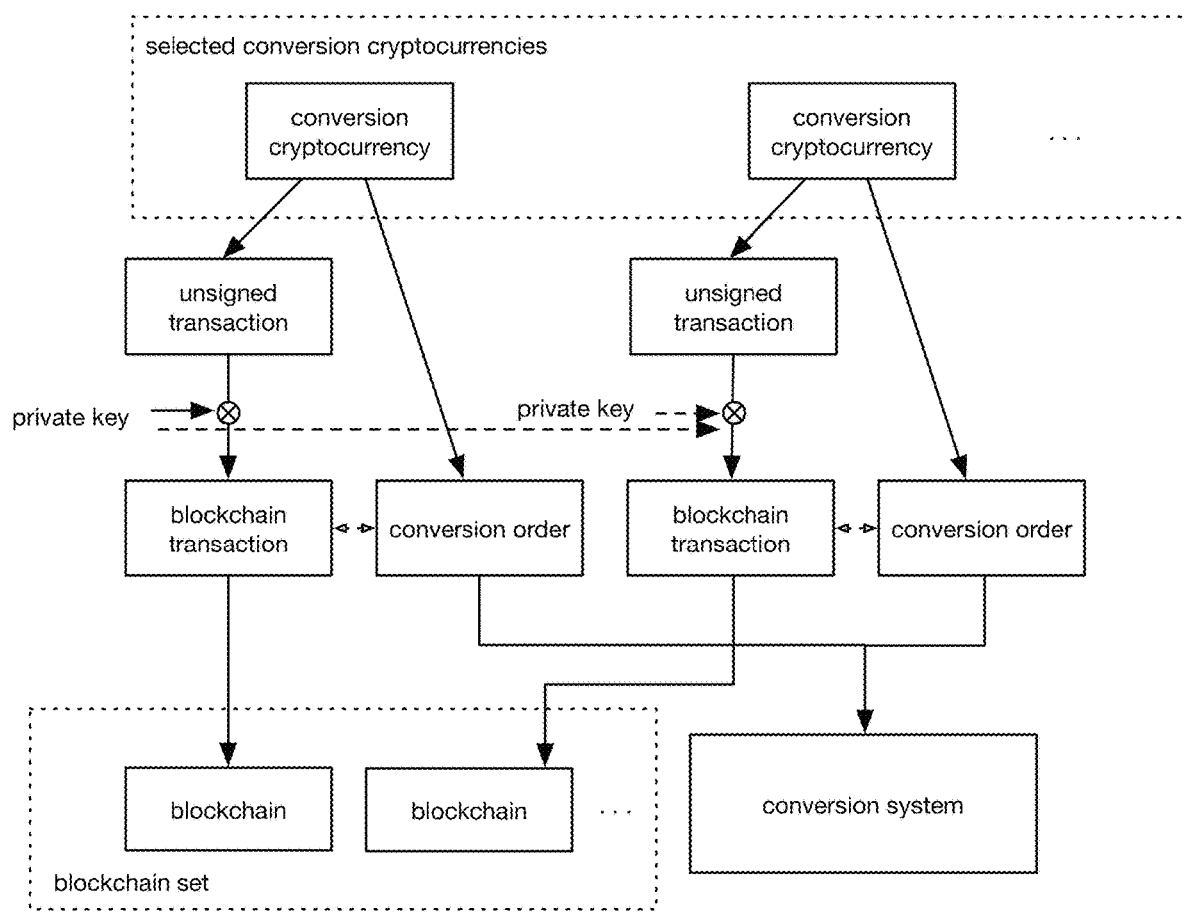
FIG. 5 is a schematic representation of example data elements generated for each selected conversion cryptocurrency and corresponding use.

Determining unsigned versions of the blockchain transactions S220 functions to prepare a different blockchain transaction for each conversion cryptocurrency to be converted (example shown in FIG. 5). The unsigned blockchain transactions can be: constructed (e.g., based on the conversion information), retrieved, or otherwise determined.

S220 is preferably performed by the client, but can be performed by another system. S220 can be performed before S600 (e.g., responsive to a precursor conversion initiation request or action), after S600 (e.g., responsive to S600), and/or at any other suitable time.

S220 preferably constructs a different blockchain transaction for each conversion cryptocurrency, because different conversion cryptocurrencies can have different transfer paths, different blockchains, different protocols (e.g., and therefore different transaction format requirements), and/or otherwise differ. However, the same blockchain transaction can be constructed for one or more different conversion cryptocurrencies. For example, each ERC20 token's transaction needs to be routed through the ERC20 token's respective smart contract, so each ERC20 token can require a different blockchain transaction (e.g., that includes the ERC20 tokens' specific transaction path). In a second example, Bitcoin transactions (e.g., for the Bitcoin cryptocurrency and/or the Bitcoin blockchain) and Ethereum transactions (e.g., for the Ethereum cryptocurrency and/or the Ethereum blockchain) have different formats, and therefore can require different transaction instances. In a third example, UTXO transactions are constructed differently from account-based transactions, and therefore can require different transaction instances. Alternatively, a single blockchain transaction can be used to transfer multiple conversion cryptocurrencies.

Each blockchain transaction is preferably constructed based on the conversion information associated with the conversion cryptocurrency and the transaction format associated with the conversion cryptocurrency, but can be otherwise constructed. A blockchain transaction for a given conversion cryptocurrency can be generated based on the specific conversion cryptocurrency's conversion address, the specified transaction amount for the conversion cryptocurrency, and optionally the conversion cryptocurrency-specific or conversion cryptocurrency-blockchain-specific settlement address. In a second example (e.g., for UTXO-based assets), S220 can include: selecting the conversion cryptocurrency coins (e.g., UTXOs) to cooperatively meet or exceed the specified transaction amount for the conversion cryptocurrency, and generate a blockchain transaction using the selected conversion cryptocurrency coins.

However, the unsigned blockchain transactions (uTx) can be otherwise generated.

Accessing private key information S230 functions to determine the information required to create a valid signature for each blockchain transaction. In some variants of the method, S230 can be optional (e.g., when the client is a smart contract). S230 is preferably performed by the client, but can alternatively be performed by the conversion system or another system. S230 can be performed after S600 (e.g., wherein the private key information is accessed responsive to S600, which can add a layer of security and prevent accidental conversion; example shown in FIG. 7), performed before S600 (e.g., wherein the private key information is accessed responsive to a precursor conversion indication, alternative example shown in FIG. 7), performed before S240, performed after S100 (e.g., based on the conversion addresses of the selected conversion cryptocurrencies), performed before, during, or after S220, and/or at any other suitable time.

Figure 10D:
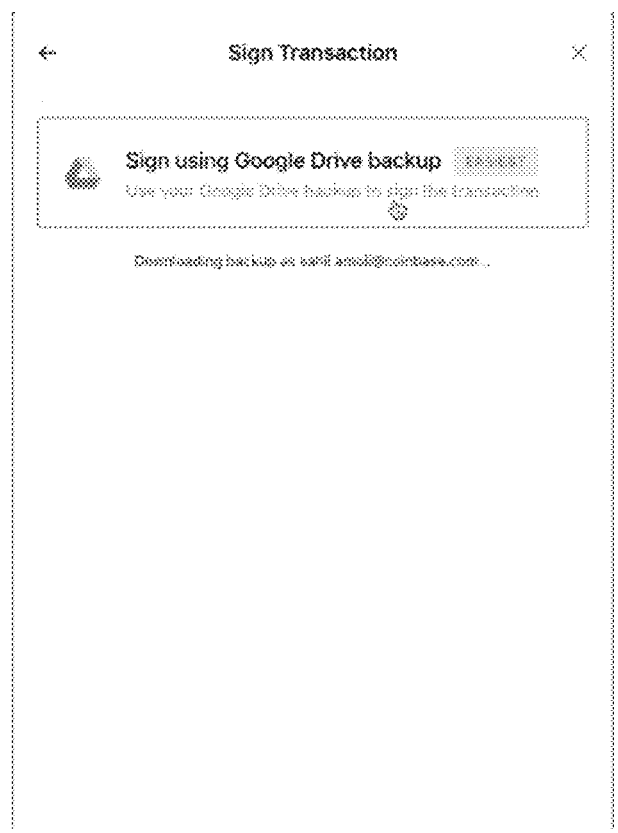
FIG. 10D is an example of a user interface for private key information access.

S230 can be performed in response to explicit user authorization to access the private key information (example shown in FIG. 10D), or be performed without explicit user access authorization (e.g., wherein access can be pregranted for a predetermined period of time, implicitly granted by user login or user access, automatically granted by confirming concurrent user login to the client and the conversion system, not required, etc.). User access authorization can include: the single action from S600, a secondary authentication (e.g., 2FA, user selection of a "sign" or "convert" indicator, etc.), a signed authorization message signed by the private key, and/or any other suitable authorization.

The private key information can include: a seed phrase (e.g., used to derive the private key), the private key itself, an encrypted version of the private key or seed phrase, shards of the private key or seed phrase (to be reconstructed to access the private key), encrypted shards, and/or other information.

The private key can be: retrieved from storage, reconstructed (e.g., from shards retrieved from storage), derived (e.g., from a seed phrase), decrypted (e.g., using an encryption key stored by the client, by the mobile device, by the conversion system, etc.; using the user private key access authorization, such as a biometric signature; etc.), and/or otherwise determined. The private key information storage can be: an HSM, cloud storage, a password manager, mobile device keystore, a cold storage system, and/or any other suitable storage system.

Different private key information can be accessed for each conversion cryptocurrency, for each unique blockchain of the conversion cryptocurrency set, for each blockchain transaction and/or for any other suitable set of conversion cryptocurrencies. For example, a single private key can be accessed for all ERC20 tokens and ETH held by a user, while different private keys are accessed for ETH and BTC, respectively. Alternatively, the same private key can be used for all conversion cryptocurrencies (e.g., when a single private key is used to generate the blockchain-specific or conversion cryptocurrency-specific conversion accounts holding the conversion cryptocurrencies). The private key information that is accessed is preferably for the private keys controlling the conversion accounts of the selected conversion cryptocurrencies; alternatively, all private key information for all conversion accounts (e.g., controlled by the user) can be accessed, or a subset of the private key information can be accessed.

In a first example, S230 includes, responsive to S600: identifying the seed phrases that need to be retrieved based on the conversion addresses of the selected conversion cryptocurrencies; retrieving each seed phrase from private key storage; optionally decrypting the seed phrase (e.g., using a stored password or key); and deriving the private key controlling each conversion account from the respective seed phrase.

In a second example, the method includes: identifying the private key information to be retrieved based on the conversion addresses of the selected conversion cryptocurrencies; prompting the user to authorize access to the private key information; receiving user access authorization (e.g., wherein the user access authorization can be the single action of S600); and accessing the private key information S23o responsive to user access authorization.

However, the private key information can be otherwise accessed.

Signing the unsigned transactions using the respective private key information S240 functions to generate signed blockchain transactions, which, when completed (e.g., settled by the blockchain, mined, verified, confirmed, etc.), will transfer or withdraw the conversion cryptocurrency to the respective settlement address.

S240 is preferably performed by the client, but can additionally or alternatively be performed by the private key store (e.g., wherein the unsigned transactions are transferred to the private key store for signature), the secure signing enclave of the user device (e.g., mobile device, laptop, etc.), a signing module executing in volatile storage, and/or by any other suitable component.

S240 is preferably performed after S600 (e.g., responsive to S600), after S100, S220, and S230, and before S250, but can be performed before S600, include S600 (e.g., wherein user confirmation to sign the unsigned transactions is the single action), or be performed at any other suitable time. S240 is preferably performed without any additional user input, but can alternatively require user input (e.g., user confirmation to sign the batch of transactions, user confirmation to sign each transaction).

S240 can include, for each of the set of unsigned transactions generated in S220: determining the private key associated with the unsigned transaction (e.g., based on the unsigned transaction's conversion address, cryptocurrency, metadata, etc.; example shown in FIG. 5); and generating a signature for the unsigned transaction using the private key. For example, transactions for all ERC20 tokens and ETH can be signed with the same private key. In another example, transactions for Ethereum blockchain cryptocurrencies can be signed using a first key, and Bitcoin blockchain cryptocurrencies can be signed using a second, different key. S240 preferably signs the set of unsigned transactions as a batch (e.g., contemporaneously), but can alternatively individually sign each of the set of unsigned transactions or sign the unsigned transactions in any order.

Sending the signed transactions to the respective blockchains S250 functions to facilitate on-chain transaction confirmation, which withdraws the conversion cryptocurrency to the settlement address.

S250 is preferably performed after S240 (e.g., in response to S240 completion), but can be performed at another time. S250 is preferably performed after S600 (e.g., in response to S600), but can alternatively be performed before S600. For example, the signed transactions can be generated before single action performance, and broadcast to the set of blockchains in response to single action performance. In a second example, single action performance triggers downstream signed transaction creation and blockchain broadcasting. However, S250 can be performed at any other suitable time.

S250 is preferably performed by the client, more preferably a blockchain module but alternatively another component, but can alternatively be performed by a third party system, the conversion system, and/or by any other suitable system (e.g., wherein the signed transactions are sent to the conversion system from the signing system).

Figure 6:
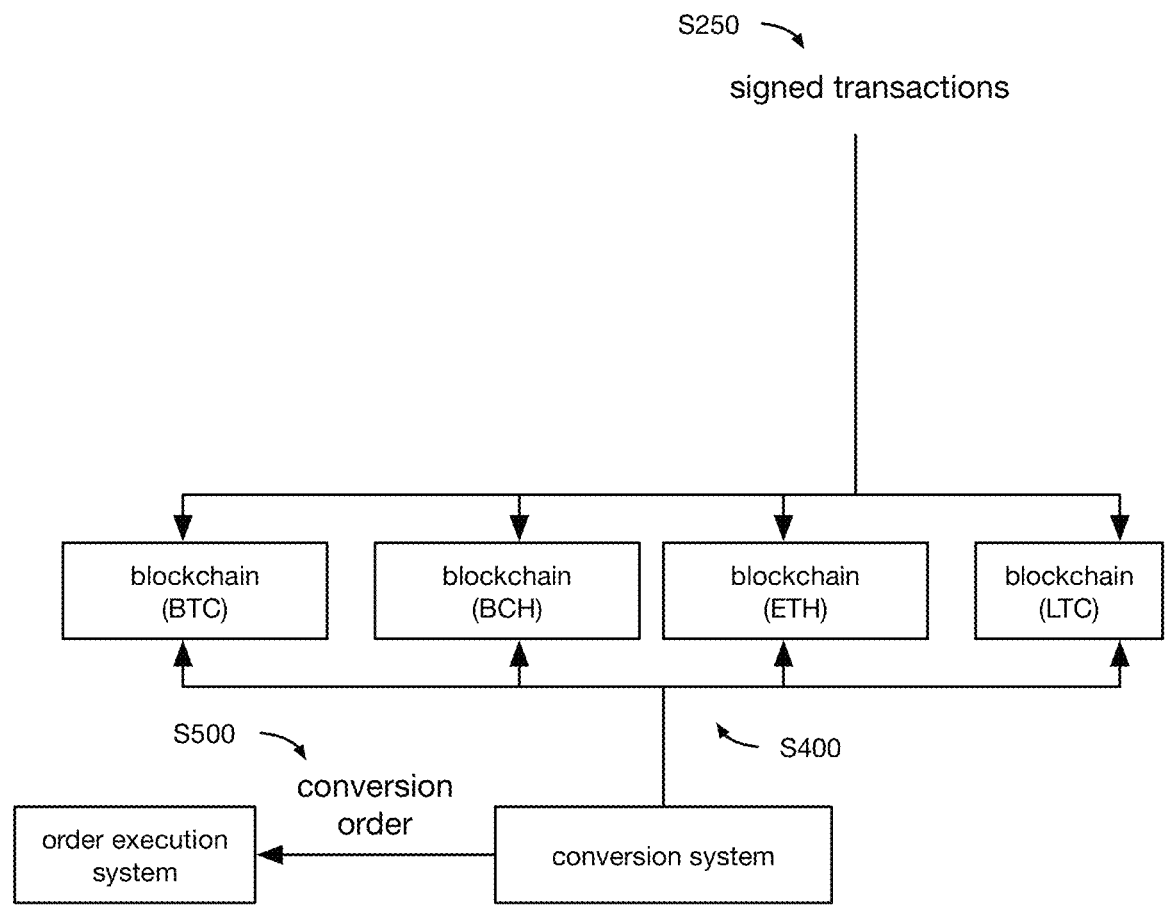
FIG. 6 is an illustrative example of S400 and S500.

S250 preferably includes: determining which blockchain each signed transaction should be sent to (e.g., based on the conversion cryptocurrency, based on the transaction construction, etc.); and sending each signed transaction to the respective blockchain (example shown in FIG. 5; illustrative example shown in FIG. 6). However, S250 can be otherwise performed. The blockchains that the transactions are sent to are preferably decentralized (e.g., non-proprietary), but can alternatively be proprietary (e.g., specific to the conversion system, etc.). The signed transactions can be sent to the respective blockchains: as a batch, serially (e.g., based on a predetermined order, based on a nonce, etc.), and/or in any other suitable order. In one example, when different conversion cryptocurrencies sharing a common blockchain are being converted and are all held by the same conversion address (e.g., multiple ERC20 tokens), the signed transactions for each conversion cryptocurrency (e.g., ERC20 token) can include a different nonce value, wherein the conversion cryptocurrency transactions (e.g., ERC20 transactions) can be serially broadcast to the Ethereum blockchain. The broadcasting system can monitor the blocks to confirm that the previously-broadcast transaction is completed (e.g., detected, mined, validated, confirmed, etc.) before broadcasting the next conversion cryptocurrency transaction (e.g., ERC20 transaction) of the set.

However, the transactions can be otherwise sent to the respective blockchains.

In an alternative variant, S200 can include flushing any conversion cryptocurrencies received at the conversion address to the settlement address. This variant can be particularly applicable when a smart contract is deployed at the conversion address, but can be used for externally owned accounts as well. In this variant, S200 can automatically send the funds to the settlement address based on a stored conversion configuration (e.g., determined in S100). In a first embodiment, this can include executing a function to transfer assets to the settlement address. The function can be executed in the same block as conversion cryptocurrency receipt (e.g., atomically), in a different block from conversion cryptocurrency receipt, and/or otherwise executed. In a second embodiment, this can include automatically executing S600-S250. However, S200 can be otherwise performed.

As shown in FIG. 3, the method can optionally include coordinating order execution with the conversion system S270, which functions to ensure that the correct conversion orders are executed, and/or that the resultant settlement assets are allocated to the correct user account. S270 can be performed: in response to S600, in parallel with transaction construction and signing, after S250, and/or at any other suitable time. S270 can be performed by the client, by the conversion system, by the user, and/or by any other suitable system.

In a first variant, S270 includes sending a conversion request to the conversion system (example shown in FIG. 7), wherein the conversion system associates the identified transactions with the user account based on information within the conversion request, and can optionally generate conversion orders based on said information. The conversion request can include at least a transaction identifier (e.g., transaction hash, transaction fingerprint, timestamp, transaction amount, etc.), and can additionally or alternatively include: the conversion cryptocurrency, the settlement asset, the transaction amount, the settled conversion cryptocurrency amount (e.g., estimated or actual, after mining), a user identifier (e.g., user account identifier, user-specific API token, etc.), and/or any other suitable information.

In a second variant, S270 is facilitated by a settlement address that is specific to each user account (offchain user account), such that coordination is implicitly performed in S100 and S250. In this variation, the conversion request can include a user identifier, and optionally an indication that any funds received at settlement addresses associated with the user (and/or a specific set of settlement addresses) should be converted to the settlement asset. In this variation, the conversion system generates a different set of settlement address for each batch of conversions for a given user account, wherein each settlement address in the set is associated with a specific user. Each settlement address in the set can be one-time use, or be resusable (e.g., for the same user-conversion cryptocurrency combination). Different settlement addresses within the set can be for different cryptocurrencies, for different blockchains, be redundant, or be otherwise related. The client then generates a blockchain transaction for each conversion cryptocurrency using the respective settlement address of the set (e.g., the settlement address for the conversion cryptocurrency). When the conversion system detects transaction confirmation at a settlement address of the set, the conversion system automatically attributes the transaction to the user account. In this variation, the conversion system can determine the conversion cryptocurrency type from the settlement address or the confirmed transaction, determine the conversion cryptocurrency amount from the confirmed transaction, and use predetermined or default conversion configurations for the settlement asset and/or order parameters when constructing the conversion order.

In a third variant, S270 is wholly performed by the client, and includes the client generating the conversion orders S500, monitoring the blockchains for completion of the submitted transactions S400, then submitting the conversion orders to the conversion system for execution when the order execution condition is met (e.g., the associated blockchain transaction is completed; more than a threshold proportion of the blockchain transaction batch is completed; a time period is met; etc.).

However, order execution can be otherwise coordinated.

Determining conversion orders S300 functions to construct trade orders for subsequent execution in S500.

S300 is preferably performed by the conversion system (e.g., wherein the order information can be sent to the conversion system by the client as part of a conversion request), but can alternatively be performed by the client or other system.

S300 can be performed: after S100, as part of S100, after S200, concurrently with S200, as part of S200, after S400 (e.g., responsive to transaction completion determination), before S400 (e.g., before the blockchain transaction is complete), and/or at any other suitable time. S300 can be performed after S600 (e.g., after single action performance, responsive to single action performance; without additional user input after S600), before S600 (e.g., wherein the conversion orders can be sent to the conversion system and/or executed in response to S600), and/or at any other suitable time. S300 is preferably automatically performed, but can alternatively be manually performed, manually authorized (e.g., require user input before order submission and/or execution), and/or otherwise controlled.

S300 can be performed: in response to receipt of a conversion request (e.g., example shown in FIG. 7), in response to detection of a predetermined event (e.g., blockchain transaction detection at a user-specific settlement address, blockchain transaction completion, etc.; alternative example shown in FIG. 7), and/or in response to any other trigger. For example, the conversion system can detect a blockchain event (e.g., emitted by a smart contract, emitted from blockchain transaction validation, etc.) associated with a monitored blockchain transaction based on blockchain information that is read from a blockchain node, and automatically generate a conversion order to convert the received amount to the settlement asset.

Each conversion order is preferably specific to a conversion cryptocurrency-settlement asset pair (e.g., as shown in FIG. 5), but can alternatively convert multiple conversion cryptocurrencies to the settlement asset. Each conversion cryptocurrency is preferably associated with one conversion order, but can alternatively be associated with a set of conversion orders, particularly when the conversion system does not support a direct conversion cryptocurrency-settlement asset trade, but does support other pairs that, when strung together, cooperatively transfer the conversion cryptocurrency to the settlement asset. For example, the conversion system may not support a DAI-USDC pair, but can support DAI-ETH and ETH-USDC pairs. In this example, the conversion cryptocurrency (e.g., DAI) can be associated with two conversion orders: a first DAI-ETH order and a second ETH-DAI order. In another example, the conversion system may not support a cryptocurrency-to-non-cryptocurrency conversion. In this example, the conversion cryptocurrency can be associated with multiple conversion orders that convert the conversion cryptocurrency via an intermediate asset that can be exchanged for the non-cryptocurrency asset (e.g., wherein the different conversion orders can be executed on different exchanges). In an illustrative example, BTC can be converted to USD (e.g., directly or via USDC, which is then converted to USD), then converted to gold (e.g., on another exchange).

The set of conversion orders corresponding to the set of conversion cryptocurrencies selected in S100 are preferably generated as a batch, but can alternatively be generated asynchronously (e.g., when each respective conversion cryptocurrency transaction is confirmed) or generated in any other suitable order at any other suitable time.

The conversion order can include: the conversion cryptocurrency, the settlement asset, the trade amount, the exchange rate, the order parameters, such as order type (e.g., market, limit order, stop loss, stop limit, trailing stop loss, etc.) or time in force (e.g., good till cancelled, fill or kill, immediate or cancel, on the open, on the close, day, etc.), and an identifier for the associated blockchain transaction (e.g., the blockchain transaction withdrawing the conversion order's conversion cryptocurrency to the conversion system), but can additionally or alternatively include any other suitable information.

The conversion cryptocurrency and settlement asset are preferably provided by the conversion request (e.g., sent by the client), but can be automatically determined. For example, the settlement asset can be retrieved from a set of user preferences stored by the conversion system.

The trade amount can be determined from: the conversion request, the settled conversion cryptocurrency amount (e.g., conversion cryptocurrency amount received at the settlement address), the transaction amount (e.g., amount of conversion cryptocurrency sent to the blockchain, wherein the trade amount is calculated from the transaction amount), and/or otherwise determined.

The exchange rate can be: the exchange rate used to estimate the settlement amount in S100, the current exchange rate, the exchange rate at the time of conversion order execution (e.g., market rate), a limit rate (e.g., wherein the trade is executed at the limit rate or better), and/or any other suitable exchange rate. The limit rate can be: specified by the user (e.g., in S100), specified by the conversion request, be the rate used in S100, or be otherwise determined.

The order parameters can be automatically determined, manually determined, or otherwise determined. The order parameters can be: default parameter values, specified by the user (e.g., specified in S100, specified by user preferences, etc.), and/or otherwise determined.

The conversion order can be associated with an identifier for a blockchain transaction from S200, which functions to disambiguate received transactions and credit received conversion cryptocurrencies to different offchain user accounts on the conversion system. The identifiers can also map on-chain transactions to the offchain conversions. In one variation, this identifier is used to trigger conversion order submission and/or execution (e.g., responsive to blockchain transaction confirmation). In a second variation, this identifier is used to trigger asset reallocation on the conversion system's ledger. However, the identifier can be otherwise used.

The identifier can be: a hash of the blockchain transaction, the settlement address (e.g., wherein the conversion system issues a user- and conversion cryptocurrency-specific settlement address for each transaction), a combination of the settlement address and auxiliary data (e.g., wherein the conversion system issues a user-specific settlement address or a shared conversion cryptocurrency-specific or blockchain-specific settlement address and the auxiliary data values are used to disambiguate between transactions received at said settlement address), an offchain user identifier (e.g., username, which can be mapped to a set of settlement addresses stored by the conversion system), a combination thereof, and/or be any other suitable parameter. Examples of auxiliary data that can be used to disambiguate the transactions can include: the identifier for the ERC20 smart contract sending the conversion cryptocurrency; the transaction's broadcast time; the transaction's broadcast location; a transaction nonce; a secondary value, issued by the conversion system to the transaction construction system, that is specific to the transaction; the conversion address; the transaction amount; and/or any other suitable data.

The identifier can be: received as part of the conversion request in association with the conversion cryptocurrency; be generated by the conversion system (e.g., when the conversion system broadcasts the signed transaction; when a user- and conversion cryptocurrency-specific settlement address is provided by the conversion system; etc.); be inferred by the conversion system; and/or otherwise determined by the conversion system.

However, the conversion order can include any other suitable parameter.

In first example of S300, the conversion system can detect asset receipt at a settlement address associated with conversion for a specific user, wherein the conversion system can automatically generate a conversion order to convert the received amount to the settlement asset previously specified by the specific user (e.g., based on market rates and default order parameter values).

In a second example of S300, the conversion system can receive a conversion request with the conversion order information, and generate a conversion order having the requested conversion order values.

However, the conversion order can be otherwise generated.

Determining transaction completion S400 functions to determine when a blockchain transaction, identified by a blockchain identifier associated with a conversion order, has been completed on-chain. S400 can also function to determine when the conversion cryptocurrencies have been withdrawn to the settlement addresses. In response to S400, the settled conversion cryptocurrency amount can be credited to the offchain user account (e.g., example shown in FIG. 7).

S400 is preferably performed by the conversion system, but can alternatively be performed by the client or by any other suitable system. All or portions of S400 are preferably performed after S250; but can additionally or alternatively be performed before S250; after the conversion request is received; before, after, or concurrently with S300, S200, and/or S500 (e.g., with or without any intervening user inputs); performed after S600 (e.g., without any intervening user inputs); and/or at any other suitable time.

S400 is preferably performed using blockchain information read from a set of blockchain nodes, each synchronized with a different blockchain of the monitored blockchain set. The monitored set of blockchains are preferably the blockchains of the conversion cryptocurrencies selected for conversion in S100, but can additionally or alternatively be all blockchains supported by the conversion system, a subset thereof, and/or any other suitable set of blockchains.

S400 is preferably performed using the transaction identifiers associated with the conversion orders determined in S300, but can alternatively be performed using other information. For example, the conversion system monitors the blockchains for the respective transaction identifiers in S400, and can facilitate asset transfer associated with the conversion order (e.g., conversion order execution, user balance crediting/debiting) based on identified transaction completion.

In a first variation, transaction completion is determined when a blockchain transaction (e.g., associated with a monitored transaction identifier) is detected in the mempool of the respective blockchain.

In a second variation, transaction completion is determined when a blockchain transaction (e.g., associated with a monitored transaction identifier) is mined or validated (e.g., detected in a mined block of the blockchain).

In a third variation, transaction completion is determined when a blockchain transaction (e.g., associated with a monitored transaction identifier) is confirmed (e.g., more than a threshold number of blocks have been mined since the blockchain transaction was detected in a block of the blockchain).

However, S400 can be otherwise performed.

Executing the conversion orders S500 functions to trade the conversion cryptocurrency for the settlement asset. S500 is preferably performed by the conversion system, but can be performed by a DEX, by the client, and/or by any other suitable system. S500 can be performed: after S600, after S400, after S250, and/or at any other suitable time. S500 can be performed immediately after S600, sometime after S600, performed without any intervening user input after S600; performed after user confirmation after S600; and/or otherwise performed relative to S600. S500 can be performed for all conversion orders (for the conversion cryptocurrencies selected for conversion in S100) as a batch; as the respective blockchain transactions are confirmed; performed after a threshold number of blockchain transactions from the batch are confirmed; and/or at any other suitable time. The conversion order for a given conversion cryptocurrency can be executed before or after the respective blockchain transaction is completed.

S500 can include: submitting the conversion order to an exchange (e.g., the order book), monitoring the order settlement, optionally retrying the conversion order if the order has failed (e.g., no match is made), decrementing the user conversion cryptocurrency balance with the trade amount, and incrementing the user settlement asset balance with the settlement amount. However, S500 can be otherwise performed.

In a first variation, S500 is performed immediately after S600 is performed. This can shift market volatility risk from the user to the conversion system. In a first embodiment, the conversion system uses conversion cryptocurrencies held by the conversion system to execute the conversion orders, and is repaid the conversion cryptocurrency amount when the blockchain transaction for the respective conversion cryptocurrencies are confirmed on chain. In a second embodiment, the conversion system credits the user balance with the settlement amount in the settlement asset (e.g., transfers the settlement amount out of the conversion system's settlement asset balance to the user's balance), wherein the settlement asset (although not necessarily the settlement amount) is repaid to the conversion system after the respective blockchain transaction is confirmed on-chain and conversion orders are executed off-chain.

In a second variation, S500 is performed after S400. In this variation, the method includes: detecting completion of a blockchain transaction, determining the conversion order associated with the blockchain transaction identifier, and executing the conversion order (e.g., on an exchange). The method can optionally include incrementing the user conversion cryptocurrency balance with the settled conversion cryptocurrency amount (e.g., amount of conversion cryptocurrency transferred to the conversion system via the blockchain transaction) after the respective blockchain transaction is completed. The method can optionally include incrementing the user settlement asset balance with the resultant amount from trade execution, and decrementing the user conversion cryptocurrency balance with the traded amount.

However, S500 can be otherwise performed.

As shown in FIG. 1, the method can optionally include determining performance of a single action S600, which functions to trigger a conversion workflow that converts the conversion cryptocurrency to the settlement asset without subsequent user input (e.g., wherein the subsequent steps are performed in response to only single action performance). S600 can be performed: before S100 (e.g., wherein S100 is responsive to S600), after S100, before S220, after S220, before S240, after S240, as part of S200, and/or at any other suitable time. S600 can directly trigger performance of S100, S220, S240, and/or any other suitable process. S600 is preferably determined by the client (e.g., received at the client, but can be determined by another system. The single action is preferably performed by the user, but can alternatively be performed by an external system, the conversion system, the client, the blockchain, or any other suitable system.

The single action can be: user selection of a conversion or continuation indicator (e.g., "convert" or "continue"), user authentication (e.g., multi-factor authentication, 2-factor authentication, biometric authentication, etc.), user authorization to sign using the user private key information (e.g., user selection of a signing indicator, such as a "sign" icon; user authentication; etc.), on-chain asset receipt (e.g., confirmation thereof), and/or any other suitable action.

S600 can include: displaying information indicative of the single action (e.g., an icon or button), and detecting performance of the single action (e.g., receiving user selection of the icon or button).

In a first variation, the method includes: receiving a user indication to convert a predetermined set of cryptocurrencies (e.g., the single action S600, example shown in FIG. 3, illustrative example shown in FIG. 9), and in response to receipt of the user indication, automatically performing at least S100-S500. In this variation, the conversion information can be automatically determined and/or retrieved from predetermined conversion configurations. For example, the conversion cryptocurrencies can be any conversion cryptocurrencies with an on-chain balance above a minimum balance for the respective conversion cryptocurrency (e.g., 0, 0.3, 1, etc.) or be conversion cryptocurrencies retrieved from a predetermined conversion configuration, the settlement asset can be a default asset or predetermined settlement asset, the network speed can be a default or predetermined asset, and the private key information can be accessed in response to the single action (e.g., wherein the single action can be, be used as, or be treated as private key access authentication) or already be stored in local memory (e.g., accessible in cleartext).

Figure 10E:
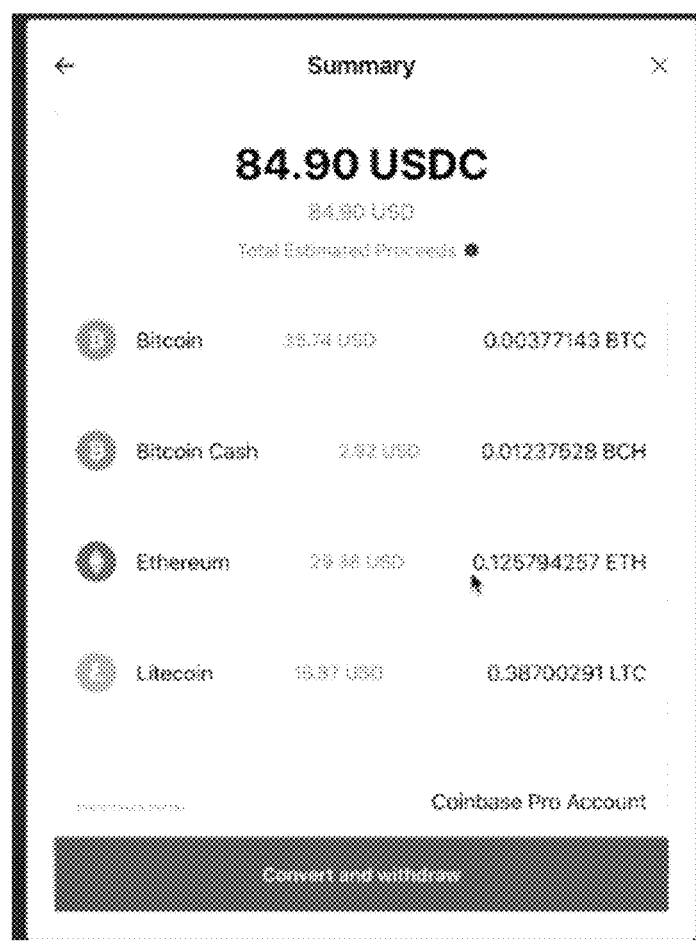
FIG. 10E is a second example of a user interface for displaying a single action indicator.

In a second variation, the method includes: receiving selections of the conversion cryptocurrencies, the settlement asset, the conversion amounts, and/or the network speed from a user (e.g., illustrative examples shown in FIGS. 10A-10C); presenting an indication of the single action (e.g., "convert and withdraw," "confirm," or "sign" icon; sending a 2-factor authentication message; presenting a biometric call to action) (e.g., illustrative example shown in FIG. 10E); determining performance of the single action S600 (e.g., selection of the "convert and withdraw," "confirm," or "sign" icon; 2-factor confirmation; biometric authentication) (e.g., alternative example shown in FIG. 7); and performing at least S240-S500 responsive to the single action. In a first embodiment, the private key is accessed before S600 (example shown in FIG. 10D). In a second embodiment, the single action is user authorization to access the private key. S220 can be performed before or after S600.

In a third variation, the method includes: performing at least S100, S220, and S240, receiving confirmation to broadcast the signed transactions (e.g., the single action S600), and performing the remainder of the method in response.

In a fourth variation, the method includes performing at least S100-S400, receiving confirmation to execute the conversion orders (e.g., the single action S600), and performing at least S500 in response.

However, all or portions of the method can be performed responsive to S600. Alternatively, a set of actions (e.g., series of actions, plurality of concurrent actions, etc.) can be used in lieu of the single action. However, S600 can be otherwise performed.

As shown in FIG. 1, the method can optionally include sending the settlement asset to a destination address S700, which functions to withdraw the settlement asset from the conversion system to a different address. The destination address can be: an off-platform address, an address controlled by a cold-stored private key, a noncustodial address, a custodial address, an address controlled by the client, and/or be any other suitable blockchain address. The destination address can be: predetermined by the user, automatically determined (e.g., wherein the user account is associated with the destination address), received from the user, determined as part of S100, and/or otherwise determined. S700 can be automatically performed, manually performed, and/or otherwise performed. S700 can be performed after S500, before S500, or at any other suitable time. S700 is preferably performed after S600 (e.g., without intervening user input; with intervening user input; etc.), but can be otherwise performed. all or parts of S500 can be performed by the conversion system, the client, and/or another system.

S700 can include (e.g., example shown in FIG. 4): generating an unsigned transaction to send a destination amount of the settlement asset to the destination address; signing the unsigned transaction using the custodial private key controlled by the conversion system; and broadcasting the signed transaction to the blockchain of the settlement asset. The destination amount can be the settlement amount, be the settlement amount less platform fees, and/or be any other suitable amount. The amount received at the destination address can be the destination amount less network fees, or be any other suitable amount.

The method can additionally include providing user notifications. Notifications can be sent, presented, or otherwise provided. The user can be notified through: the client, a web interface, a user account, an email, and/or through any other suitable communication channel. Notifications can be provided (e.g., sent) when: the single action is performed; the blockchain transactions are all or partially broadcast to the respective blockchains; the blockchain transactions are completed; the conversion orders are executed; the conversion orders are completed; the settlement asset is sent to the destination address (e.g., notified at transaction broadcast to the blockchain; notified at transaction confirmation; notified when the funds are available for use; etc.); and/or at any other suitable time.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system component variants and the various method process variants, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A custodial cryptocurrency system configured to perform automated batch-signed cryptocurrency conversions for reducing block confirmation monitoring resources, the system comprising at least one processor and at least one memory storing computer-executable instructions that, when executed by the at least one processor, cause operations comprising:

storing a custodial key collection of private keys via different storage schemes comprising a hot storage scheme and a cold storage scheme, wherein a first portion of the custodial key collection is stored in a hot storage system via the hot storage scheme, and a second portion of the custodial key collection is stored in a cold storage system via the cold storage scheme;

generating and providing, via a user device of a user, a user interface comprising an option to select and convert a plurality of cryptocurrencies associated with different blockchain protocols, including a first cryptocurrency and a second cryptocurrency, to a single blockchain token different from the plurality of cryptocurrencies;

in response to a single user action via the user interface that indicates a user selection of the plurality of cryptocurrencies, receiving, from the user device, a request to convert the plurality of cryptocurrencies, including the first cryptocurrency and the second cryptocurrency, to the single blockchain token, wherein each of the plurality of cryptocurrencies is associated with a blockchain address, each of the blockchain addresses being controlled by a particular custodial private key of the custodial key collection stored by the custodial cryptocurrency system; and in response to receiving the request to convert the plurality of cryptocurrencies, performing the following operations without any further user input of the user after the single user action:
  determining, based on network transaction volumes of a blockchain that are anticipated at a future time, one or more network speeds corresponding to network fees for a plurality of unsigned blockchain transactions that are predicted to reduce blockchain processing delays related to the blockchain;
  generating the unsigned blockchain transactions respectively indicating (i) the network fees for the unsigned blockchain transactions and (ii) transfers of the plurality of cryptocurrencies to intermediary blockchain addresses;
  accessing the custodial private keys that each correspond to a different blockchain protocol;
  signing each of the unsigned blockchain transactions with a corresponding custodial private key of the custodial private keys controlling the blockchain addresses;
  broadcasting the signed blockchain transactions together as part of a batch to the blockchain;
  generating a plurality of conversion requests, the plurality of conversion requests comprising first and second conversion requests to respectively convert first and second cryptocurrencies to the single blockchain token; and
  in response to detecting completion of all the signed blockchain transactions on the blockchain, executing the plurality of conversion requests together as part of the batch.

2. The system of claim 1, the operations further comprising:
  determining that a user session on the user device corresponds to an unexpired authorization.

3. The system of claim 1, the operations further comprising:
  displaying the plurality of cryptocurrencies, the single blockchain token, and a corresponding amount before generating the unsigned blockchain transactions, wherein the corresponding amount is in the single blockchain token and calculated from an initial conversion amount of each cryptocurrency of the plurality of cryptocurrencies, an exchange rate, and estimated network fee.

4. A method comprising:
  storing a collection of private keys, the collection comprising a first portion stored in a hot storage system via a hot storage scheme and a second portion stored in a cold storage system via a cold storage scheme;
  generating and providing, via a user device of a user, a user interface comprising an option to select and convert a plurality of cryptocurrencies associated with different blockchain protocols to a single blockchain token different from the plurality of cryptocurrencies;
  in response to a user action via the user interface that indicates a user selection of the plurality of cryptocurrencies, receiving, from the user device, a request to convert the plurality of cryptocurrencies to the single blockchain token, wherein each of the plurality of cryptocurrencies is associated with a blockchain address, each of the blockchain addresses being controlled by a particular custodial private key of the collection; and
  in response to receiving the request to convert the plurality of cryptocurrencies, performing the following operations without any further user input of the user after the user action:
    determining, based on transaction volumes of one or more blockchains, one or more network speeds for unsigned blockchain transactions;
    generating the unsigned blockchain transactions respectively indicating (i) network fees corresponding to the one or more network speeds for the unsigned blockchain transactions and (ii) transfers of the plurality of cryptocurrencies to one or more intermediary blockchain addresses;
    accessing the custodial private keys that each correspond to a different blockchain protocol;
    signing each of the unsigned blockchain transactions with a corresponding custodial private key of the custodial private keys controlling the blockchain addresses;
    batch broadcasting the signed blockchain transactions to the one or more blockchains;
    generating a plurality of conversion requests, the plurality of conversion requests comprising first and second conversion requests to respectively convert first and second cryptocurrencies to the single blockchain token; and
    in response to detecting completion of the signed blockchain transactions on the one or more blockchains, batch executing the plurality of conversion requests.

5. The method of claim 4, wherein accessing the custodial private keys comprises determining that a user session on the user device corresponds to an unexpired authorization.

6. The method of claim 5, wherein access for the unexpired authorization is pre-granted for a predetermined amount of time.

7. The method of claim 5, wherein access is determined based on a user log-in credential for the user device.

8. The method of claim 5, further comprising confirming that the user is concurrently logged into the user device and a computing system that performs the plurality of conversion requests.

9. The method of claim 4, further comprising, after executing the plurality of conversion requests, generating a secondary blockchain transaction sending the single blockchain token to a destination address, wherein the secondary blockchain transaction is signed by a private key held by a conversion system.

10. The method of claim 4, further comprising displaying the plurality of cryptocurrencies, the single blockchain token, and a corresponding amount before generating the unsigned blockchain transactions, wherein the corresponding amount is in the single blockchain token and calculated from an initial conversion amount of each cryptocurrency of the plurality of cryptocurrencies, an exchange rate, and estimated network fee.

11. The method of claim 4, wherein the plurality of cryptocurrencies comprises at least an unspent transaction output (UTXO)-based cryptocurrency and an account-based cryptocurrency.

12. The method of claim 4, wherein the single blockchain token comprises a stablecoin.

13. One or more non-transitory computer-readable media storing computer-executable instructions that, when executed by at least one processor, cause operations comprising:
    storing a collection of private keys, the collection comprising a first portion stored in a hot storage system via a hot storage scheme and a second portion stored in a cold storage system via a cold storage scheme;
    providing, via a user device of a user, a user interface comprising an option to select and convert a plurality of cryptocurrencies associated with different blockchain protocols to a blockchain token different from the plurality of cryptocurrencies;
    in response to a user action via the user interface that indicates a user selection of the plurality of cryptocurrencies, receiving, from the user device, a request to convert the plurality of cryptocurrencies to the blockchain token, wherein each of the plurality of cryptocurrencies is associated with a blockchain address, each of the blockchain addresses being controlled by a particular custodial private key; and
    in response to receiving the request to convert the plurality of cryptocurrencies, performing the following operations without any further user input of the user after the user action:
        determining, based on transaction volumes of one or more blockchains, one or more network speeds for unsigned blockchain transactions;
        generating a plurality of unsigned blockchain transactions respectively indicating (i) network fees corresponding to the one or more network speeds and (ii) transfers of the plurality of cryptocurrencies to one or more intermediary blockchain addresses;
        accessing the custodial private keys that each correspond to a different blockchain protocol;
        signing each of the unsigned blockchain transactions with a corresponding custodial private key of the custodial private keys controlling the blockchain addresses;
        batch broadcasting the signed blockchain transactions to one or more blockchains;
        generating a plurality of conversion requests, the plurality of conversion requests comprising first and second conversion requests to respectively convert first and second cryptocurrencies to the blockchain token; and
        in response to detecting completion of the signed blockchain transactions on the one or more blockchains, executing the plurality of conversion requests.

14. The media of claim 13, wherein accessing the custodial private keys comprises determining that a user session on the user device corresponds to an unexpired authorization.

15. The media of claim 14, wherein access for the unexpired authorization is pre-granted for a predetermined amount of time.

16. The media of claim 14, the operations further comprising confirming that the user is concurrently logged into the user device and a computing system that performs the plurality of conversion requests.

17. The media of claim 13, the operations further comprising, after executing the plurality of conversion requests, generating a secondary blockchain transaction sending the blockchain token to a destination address, wherein the secondary blockchain transaction is signed by a private key held by a conversion system.

18. The media of claim 13, the operations further comprising displaying the plurality of cryptocurrencies, the blockchain token, and a corresponding amount before generating the unsigned blockchain transactions, wherein the corresponding amount is in the blockchain token and calculated from an initial conversion amount of each cryptocurrency of the plurality of cryptocurrencies, an exchange rate, and estimated network fee.

19. The media of claim 13, wherein the plurality of cryptocurrencies comprises at least an unspent transaction output (UTXO)-based cryptocurrency and an account-based cryptocurrency.

20. The media of claim 13, wherein the blockchain token comprises a stablecoin.

\* \* \* \* \*